US012634124B2

(12) United States Patent
Ammar et al.

(10) Patent No.: US 12,634,124 B2
(45) Date of Patent: May 19, 2026

(54) IDENTITY-BASED PUBLIC-KEY GENERATION PROTOCOL

(71) Applicant: nChain Licensing AG, Zug (CH)

(72) Inventors: Bassem Ammar, London (GB); Wei Zhang, London (GB); John Fletcher, London (GB)

(73) Assignee: nChain Licensing AG, Zug (CH)

( * ) Notice: Subject to any disclaimer, the term of this patent is extended or adjusted under 35 U.S.C. 154(b) by 299 days.

(21) Appl. No.: 17/782,124

(22) PCT Filed: Nov. 6, 2020

(86) PCT No.: PCT/IB2020/060450
§ 371 (c)(1),
(2) Date: Jun. 2, 2022

(87) PCT Pub. No.: WO2021/111211
PCT Pub. Date: Jun. 10, 2021

(65) Prior Publication Data
US 2023/0021047 A1    Jan. 19, 2023

(30) Foreign Application Priority Data

Dec. 6, 2019    (GB) ..................................... 1917896

(51) Int. Cl.
*H04L 9/08*        (2006.01)
*H04L 9/00*        (2022.01)
(52) U.S. Cl.
CPC .......... *H04L 9/0866* (2013.01); *H04L 9/0825* (2013.01); *H04L 9/50* (2022.05)
(58) Field of Classification Search
None
See application file for complete search history.

(56) References Cited

U.S. PATENT DOCUMENTS 7,590,236 B1    9/2009 Boneh et al.
8,320,559 B1 * 11/2012 Boneh ................... H04L 9/0841
                                                          713/168
(Continued)

FOREIGN PATENT DOCUMENTS

CN        110914850 A        3/2020
EP          3721582 A1 * 10/2020    ........... H04L 9/0637
(Continued)

OTHER PUBLICATIONS

Yongming Xie, "Distributed Private-Key Generation Scheme with Self Certified identity", 2011, IEEE, 501-508 (Year: 2011).*
(Continued)

*Primary Examiner* — Jeffrey C Pwu
*Assistant Examiner* — Mayasa A. Shaawat
(74) *Attorney, Agent, or Firm* — Galvani Smith PLLC

(57)        ABSTRACT

A computer-implemented method for generating an identity-based cryptographic key, the method comprising: obtaining a set of private key shares and a set of corresponding public key shares, wherein each private key share is generated based on the personal identifier, and wherein at least one of the set of private key shares is generated by a respective one of a set of key-generating parties; generating an identity-based private key based on each of the one or more private key shares; and generating a partial identity-based public key, wherein the partial identity-based public key is generated based on each of the set of corresponding public key shares; transmitting the partial identity-based public key to at least one of the set of key-generating parties for generating the identity-based public key; and/or generating the identity-based public key, wherein the identity-based public key comprises the personal identifier and the partial identity-based public key.

18 Claims, 9 Drawing Sheets

(56) References Cited

U.S. PATENT DOCUMENTS

| | | | | |
|---|---|---|---|---|
| 11,134,379 | B2 * | 9/2021 | Shi | H04L 63/061 |
| 2013/0191632 | A1 | 7/2013 | Spector | |
| 2017/0302450 | A1 * | 10/2017 | Ebrahimi | H04L 9/0643 |
| 2017/0330180 | A1 | 11/2017 | Song et al. | |
| 2019/0044734 | A1 * | 2/2019 | Lancashire | H04L 9/3239 |
| 2021/0391991 | A1 * | 12/2021 | Aschauer | H04L 9/0825 |

FOREIGN PATENT DOCUMENTS

| | | | | |
|---|---|---|---|---|
| EP | 3721582 | B1 * | 10/2020 | H04L 9/0637 |
| GB | 2583770 | A | 11/2020 | |
| JP | 2005500740 | A | 1/2005 | |
| JP | 2019507539 | A | 3/2019 | |
| WO | 2019021105 | A1 | 1/2019 | |

OTHER PUBLICATIONS

PCT/IB2020/060450 International Search Report and Written Opinion dated Mar. 19, 2021.

Yongming Xie et al: 11 Distributed Private-Key Generation Scheme with Self-Certified Identity11 , Trust, Security and Privacy in Computing and Communications (TRUSTCOM) , 2011 IEEE 10th International Conference On, IEEE, Nov. 16, 2011 (Nov. 16, 2011), pp. 501-508, XP032086840,DOI: 10.1109/TRUSTCOM.2011.65 ISBN: -978-1-4577-2135-9 pp. 503-506.

Zhou Beini et al: "An Authentication Scheme Using Identity-based Encryption & Blockchain", 2018 IEEE Symposium on Computers and Communications (ISCC), IEEE, Jun. 25, 2018 (Jun. 25, 2018), pp. 556-561, XP033448510, DOI: 10.1109/ISCC.2018.8538446 p. 556-p. 561.

Aniket Kate et al: "Asynchronous Distributed Private-Key Generators for Identity-Based Cryptography", IACR, International Association for Cryptologic Research, vol. 20100723:210612, Jul. 23, 2010 (Jul. 23, 2010), pp. 1-31, XP061003781, p. 3-p. 22.

GB1917896.1 Combined Search and Examination Report dated Aug. 28, 2020.

Arunkumar, Saritha et al: Decentralised Certificateless Public-Key Infrastructure, Annual Fall Meeting of ITA, Ministry of Defense, Jan. 8, 2013, pp. 1, International Technology Alliance in Network and Information Sciences, United Kingdom.

Wikipedia contributors, 'Key disclosure law', Wikipedia, The Free Encyclopedia, Nov. 18, 2019, 03:39 UTC, <https://en.wikipedia.org/w/index.php?title=Key_disclosure_law&oldid=926699596>.

Tokenized, Issue, Manage and Trade Digital Tokens, https://tokenized.com, May 12, 2019.

Boneh, Dan et al, Identity-Based Encryption from the Weil Pairing, SIAM J. of Computing, 2003, pp. 586-615, United States.

M. Groves, Mikey-Sakke: Sakai-Kasahara Key Encryption in Multimedia Internet KEYing (MIKEY), Feb. 2012, pp. 1-21, Internet Engineering Task Force, Cheltenham, UK.

Zhou, B. et al; "An Authentication Scheme Using Identity-based Encryption & Blockchain," 2018 IEEE Symposium on Computers and Communications (ISCC), pp. 556-561; IEEE.

* cited by examiner

| TxID$_0$ | | TxID$_1$ | |
|---|---|---|---|
| Input(s) | Output(s) | Input(s) | Output(s) |
| <u>Input</u><br>• Pointer to previous $Tx$<br>• Index of $UTXO$ in previous $Tx$<br>• Unlocking script for unlocking from previous party | <u>$UTXO_0$</u><br>• Amount<br>• Locking script locking to Alice | <u>Input</u><br>• Pointer to $Tx_0$<br>• Index of $UTXO_0$ [within $Tx_0$]<br>• Unlocking script for unlocking $UTXO_0$ from Alice | <u>$UTXO_1$</u><br>• Amount<br>• Locking script locking to Bob |
| ⋮<br>Optional further inputs<br>⋮ | ⋮<br><br>Optional further $UTXO$s<br>⋮ | ⋮<br><br>Optional further inputs<br>⋮ | ⋮<br><br>Optional further $UTXO$s<br>⋮ |

203

203

202

Transaction
from Alice to Bob

Validated by running: Alice's
locking script (from output of $Tx_0$),
together with Alice's unlocking
script (as input to $Tx_1$). This checks
that $Tx_1$ meets the condition(s)
defined in Alice's locking script.

600

IDENTITY-BASED PUBLIC-KEY GENERATION PROTOCOL

CROSS REFERENCE TO RELATED APPLICATIONS

This application is the U.S. National Stage of International Application No. PCT/IB2020/060450 filed on Nov. 6, 2020, which claims the benefit of United Kingdom Patent Application No. 1917896.1, filed on Dec. 6, 2019, the contents of which are incorporated herein by reference in their entireties.

TECHNICAL FIELD

The present disclosure relates to methods for generating cryptographic keys based on an identity of a user.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence which may span one or more blocks. Transactions can be submitted to the network to be included in new blocks by a process known as "mining", which involves each of a plurality of mining nodes competing to perform "proof-of-work", i.e. solving a cryptographic puzzle based on a pool of the pending transactions waiting to be included in blocks.

Conventionally the transactions in the blockchain are used to convey a digital asset, i.e. data acting as a store of value. However, a blockchain can also be exploited in order to lay additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance, this may be used to store an electronic document in the blockchain, or even audio or video data.

Each node in the network can have any one, two or all of three roles: forwarding, mining and storage. Forwarding nodes propagate transactions throughout the nodes of the network. Mining nodes perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, the additional user data will thus remain stored at each of the nodes in the P2P network as an immutable public record.

SUMMARY

Identity-based encryption (IBE) is a public-key cryptosystem that utilises a user's identity, e.g. their email address, as their public key. The technical challenge of IBE is to derive the corresponding private key from the public key. To overcome this, typically a trusted third party (TTP) is introduced to generate the user's private key from a master private key (known only to the TTP) and the user's identity. This solution, however, induces the problem that the TTP has knowledge of the user's private key and therefore is able decrypt messages that have been encrypted with the user's public key.

According to one aspect disclosed herein, there is provided a computer-implemented method for generating an identity-based cryptographic key, the method being performed by a first party having a personal identifier, and comprising: obtaining a set of private key shares and a set of corresponding public key shares, wherein each private key share is generated based on the personal identifier, and wherein at least one of the set of private key shares is generated by a respective one of a set of key-generating parties; generating an identity-based private key based on each of the one or more private key shares; and generating a partial identity-based public key, wherein the partial identity-based public key is generated based on each of the set of corresponding public key shares; transmitting the partial identity-based public key to at least one of the set of key-generating parties for generating the identity-based public key; and/or generating the identity-based public key, wherein the identity-based public key comprises the personal identifier and the partial identity-based public key.

According to another aspect disclosed herein, there is provided a computer-implemented method for generating an identity-based cryptographic key, wherein a first party has a personal identifier, and wherein the method is performed by a first key-generating party and comprises: transmitting a private key share to the first party, wherein the private key share is generated based on the personal identifier and has a corresponding public key share; obtaining a partial identity-based public key, wherein the partial identity-based public key is generated based on the corresponding public key share; generating and/or obtaining the identity-based public key, wherein the identity-based public key is generated based on the partial identity-based public key and the personal identifier; and generating a first blockchain transaction comprising a first output that comprises the identity-based public key.

Instead of a TTP generating the user's private key, the user (the first party) is now at least partly responsible for generating their own private key. The user receives one or more private key shares, and uses those to generate the private key. Each key-generating party, also known as a private key generator (PKG) only has knowledge of the private key share generated by itself and therefore a given PKG cannot obtain the user's complete private key. The private key shares may be combined to form the user's private key, or the user may additionally contribute a private key share to the private key. The PKGs, which are equivalent to TTPs, become semi-trusted in the sense that if the private-key-share holders do not collude, then the user's private key is only known to the user. If the user is also a private-key-share holder too, the trust on any third party, or more precisely, on the other private-key-share holders, can be dropped completely.

One, some, or all of the PKGs generate the identity-based public key (i.e. an IBE key) and store the IBE key on the blockchain in a blockchain transaction, referred to below as a "validity check transaction" (VCT). The VCT is visible in the unspent transaction output (UTXO) set of the blockchain, thus allowing interested parties to view the IBE key and check whether the IBE is still valid. Essentially the UTXO set acts as a white list for valid keys. If the IBE key, or more precisely, the corresponding private key, is compromised or needs to be revoked for some other reason, the user and/or a PKG can spend the VCT to remove the IBE key from the UTXO set. Then when an interested party wishes to check whether the IBE key is valid, they will no longer see the IBE key in the UTXO set and interpret this as the IBE key being invalid. Similarly, the IBE can be updated by sending a new VCT to the blockchain which spends the previous VCT. Spending VCT outputs provides an efficient method for immediate key revocation.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 2 schematically illustrates some examples of transactions which may be recorded in a blockchain;

DETAILED DESCRIPTION OF EMBODIMENTS

Example System Overview

Figure 1:
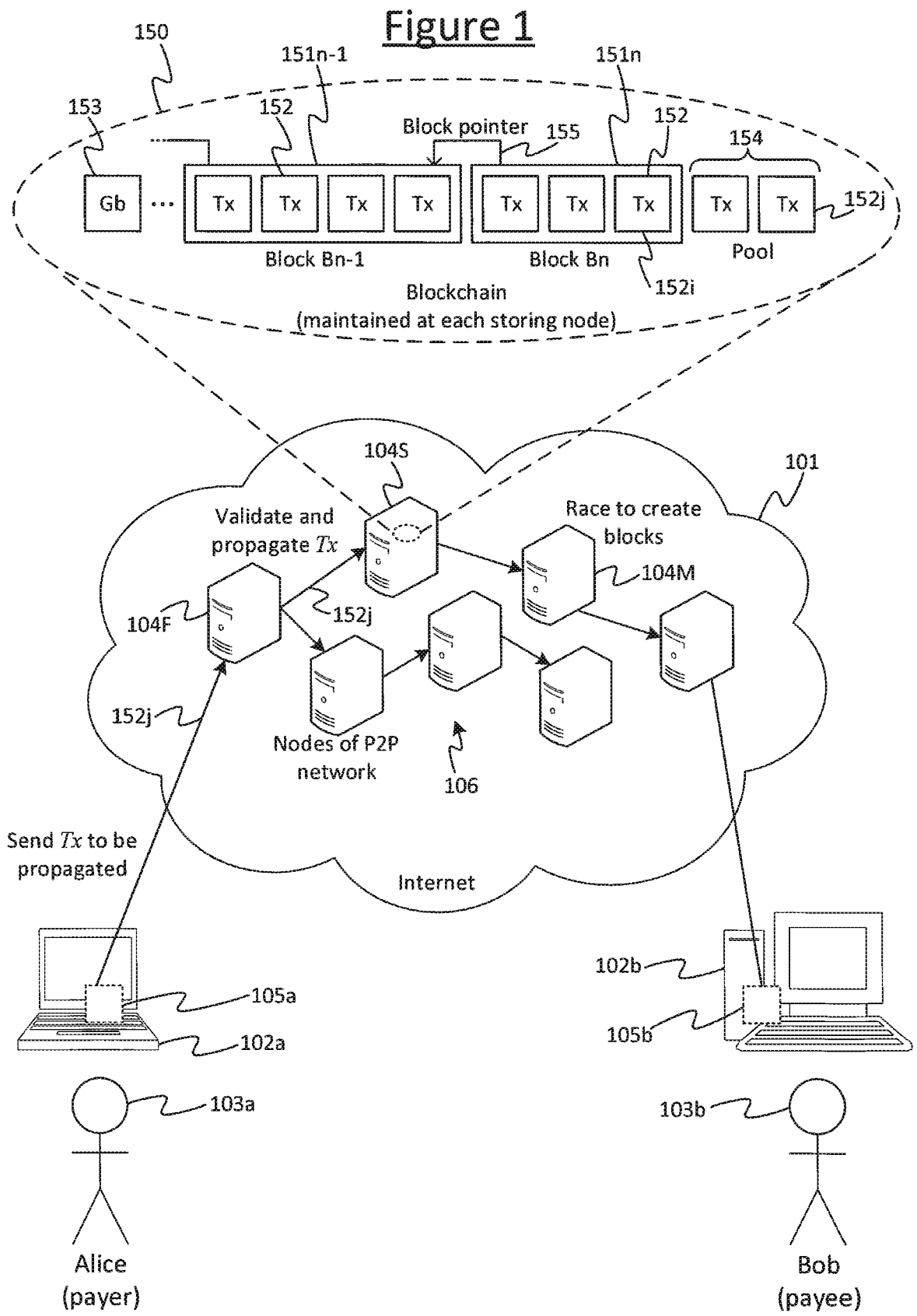
FIG. 1 is a schematic block diagram of a system for implementing a blockchain.

FIG. 1 shows an example system 100 for implementing a blockchain 150 generally. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152j, the (or each) input comprises a pointer referencing the output of a preceding transaction 152i in the sequence of transactions, specifying that this output is to be redeemed or "spent" in the present transaction 152j. In general, the preceding transaction could be any transaction in the pool 154 or any block 151. The preceding transaction 152i need not necessarily exist at the time the present transaction 152j is created or even sent to the network 106, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the signature of the user 103a to whom the output of the preceding transaction 152i is locked. In turn, the output of the present transaction 152j can be cryptographically locked to a new user 103b. The present transaction 152j can thus transfer the amount defined in the input of the preceding transaction 152i to the new user 103b as defined in the output of the present transaction 152j. In some cases a transaction 152 may have multiple outputs to split the input amount between multiple users (one of whom could be the original user 103a in order to give change). In some cases a transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

With either type of transaction protocol, when a user 103 wishes to enact a new transaction 152j, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152j matches the expected signature, which depends on the previous transaction 152i in an ordered sequence of transactions 152. In an output-based case, this may comprise checking that the cryptographic signature of the user included in the input of the new transaction 152j matches a condition defined in the output of the preceding transaction 152i which the new transaction spends, wherein this condition typically comprises at least checking that the cryptographic signature in the input of the new transaction 152j unlocks the output of the previous transaction 152i to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152j is valid, the current node forwards it to one or more others of the nodes 104 in the P2P network 106. At least some of these nodes 104 also act as forwarding nodes 104F, applying the same test according to the same node protocol, and so forward the new transaction 152j on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152j according to the node protocol. Another condition for a transaction to be valid is that the output of the preceding transition 152i which it attempts to spend or redeem has not already been spent/redeemed by another valid transaction. Again if not valid, the transaction 152j will not be propagated or recorded in the blockchain. This guards against double-spending whereby the spender tries to spend the output of the same transaction more than once. An account-based model on the other hand guards against double-spending by maintaining an account balance. Because again there is a defined order of transactions, the account balance has a single defined state at any one time.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block 151n pointing back to the previously created block 151n−1 in the chain. The proof-of-work helps reduce the risk of double spending since it takes a large amount of effort to create a new block 151, and as any block containing a double spend is likely to be rejected by other nodes 104, mining nodes 104M are incentivized not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151n, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another).

Hence the winning node is said to have "mined" a quantity of the digital asset. This special type of transaction is sometime referred to as a "generation" transaction. It automatically forms part of the new block 151*n*. This reward gives an incentive for the miners 104M to participate in the proof-of-work race. Often a regular (non-generation) transaction 152 will also specify an additional transaction fee in one of its outputs, to further reward the winning miner 104M that created the block 151*n* in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application or software 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

The instance of the client application 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 (other than a generation transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152*j*, it handles it in accordance with the node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any storage node 104S that receives the transaction 152*j* will add the new validated transaction 152 to the pool 154 in the copy of the blockchain 150 maintained at that node 104S. Further, any forwarding node 104F that receives the transaction 152*j* will propagate the validated transaction 152 onward to one or more other nodes 104 in the P2P network 106. Since each forwarding node 104F applies the same protocol, then assuming the transaction 152*j* is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

UTXO-Based Model

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO specifies an amount of a digital asset (a store of value). It may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Note that whilst each output in FIG. 2 is shown as a UTXO, a transaction may additionally or alternatively comprise one or more unspendable transaction outputs.

Say Alice 103*a* wishes to create a transaction 152*j* transferring an amount of the digital asset in question to Bob 103*b*. In FIG. 2 Alice's new transaction 152*j* is labelled "Tx$_1$". It takes an amount of the digital asset that is locked to Alice in the output 203 of a preceding transaction 152*i* in the sequence, and transfers at least some of this to Bob. The preceding transaction 152*i* is labelled "Tx$_0$" in FIG. 2. Tx$_0$ and Tx$_1$ are just an arbitrary labels. They do not necessarily mean that Tx$_0$ is the first transaction in the blockchain 151, nor that Tx$_1$ is the immediate next transaction in the pool 154. Tx$_1$ could point back to any preceding (i.e. antecedent) transaction that still has an unspent output 203 locked to Alice.

The preceding transaction Tx$_0$ may already have been validated and included in the blockchain 150 at the time when Alice creates her new transaction Tx$_1$, or at least by the time she sends it to the network 106. It may already have been included in one of the blocks 151 at that time, or it may be still waiting in the pool 154 in which case it will soon be included in a new block 151. Alternatively Tx$_0$ and Tx$_1$ could be created and sent to the network 102 together, or Tx$_0$ could even be sent after Tx$_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction Tx$_0$ comprises a particular UTXO, labelled here UTXO$_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output $203$, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input $202$ of transactions.

So in the example illustrated, $UTXO_0$ in the output $203$ of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input $202$ of $Tx_1$ comprises a pointer pointing back to $Tx_1$ (e.g. by means of its transaction ID, $TxID_0$, which in embodiments is the hash of the whole transaction $Tx_0$). The input $202$ of $Tx_1$ comprises an index identifying $UTXO_0$ within $Tx_0$, to identify it amongst any other possible outputs of $Tx_0$. The input $202$ of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node $104$, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the unlocking script (in this example a stack-based language). Equivalently the scripts may be run one after another, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data.

The expected portion of data itself (the "message") also needs to be included in $Tx_0$ order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node $104$ is able to authenticate that the encrypted version of the message must have been signed by Alice. Signing typically comprises hashing the message, signing the hash, and tagging this onto the clear version of the message as a signature, thus enabling any holder of the public key to authenticate the signature.

If the unlocking script in $Tx_1$ meets the one or more conditions specified in the locking script of $Tx_0$ (so in the example shown, if Alice's signature is provided in $Tx_1$ and authenticated), then the node $104$ deems $Tx_1$ valid. If it is a mining node $104M$, this means it will add it to the pool of transactions $154$ awaiting proof-of-work. If it is a forwarding node $104F$, it will forward the transaction $Tx_1$ to one or more other nodes $104$ in the network $106$, so that it will be propagated throughout the network. Once $Tx_1$ has been validated and included in the blockchain $150$, this defines $UTXO_0$ from $Tx_0$ as spent. Note that $Tx_1$ can only be valid if it spends an unspent transaction output $203$. If it attempts to spend an output that has already been spent by another transaction $152$, then $Tx_1$ will be invalid even if all the other conditions are met. Hence the node $104$ also needs to check whether the referenced UTXO in the preceding transaction $Tx_0$ is already spent (has already formed a valid input to another valid transaction). This is one reason why it is important for the blockchain $150$ to impose a defined order on the transactions $152$. In practice a given node $104$ may maintain a separate database marking which UTXOs $203$ in which transactions $152$ have been spent, but ultimately what defines whether a UTXO has been spent is whether it has already formed a valid input to another valid transaction in the blockchain $150$.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes $104M$, and hence although technically valid, it will still not be propagated and included in the blockchain $150$ (the miner protocol does not force miners $104M$ to accept transactions $152$ if they don't want). In some protocols, the mining fee does not require its own separate output $203$ (i.e. does not need a separate UTXO). Instead any different between the total amount pointed to by the input(s) $202$ and the total amount of specified in the output(s) $203$ of a given transaction $152$ is automatically given to the winning miner $104$. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference automatically goes to the winning miner $104M$. Alternatively or additionally however, it is not necessarily excluded that a miner fee could be specified explicitly in its own one of the UTXOs $203$ of the transaction $152$.

Note also that if the total amount specified in all the outputs $203$ of a given transaction $152$ is greater than the total amount pointed to by all its inputs $202$, this is another basis for invalidity in most transaction models. Therefore such transactions will not be propagated nor mined into blocks $151$.

Alice and Bob's digital assets consist of the unspent UTXOs locked to them in any transactions $152$ anywhere in the blockchain $150$. Hence typically, the assets of a given party $103$ are scattered throughout the UTXOs of various transactions $152$ throughout the blockchain $150$. There is no one number stored anywhere in the blockchain $150$ that defines the total balance of a given party $103$. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$]=OP_DUP OP_HASH160<H(Pa)> OP_EQUALVERIFY OP_CHECKSIG. "OP_. . . " refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Optional Side Channel

Figure 3:
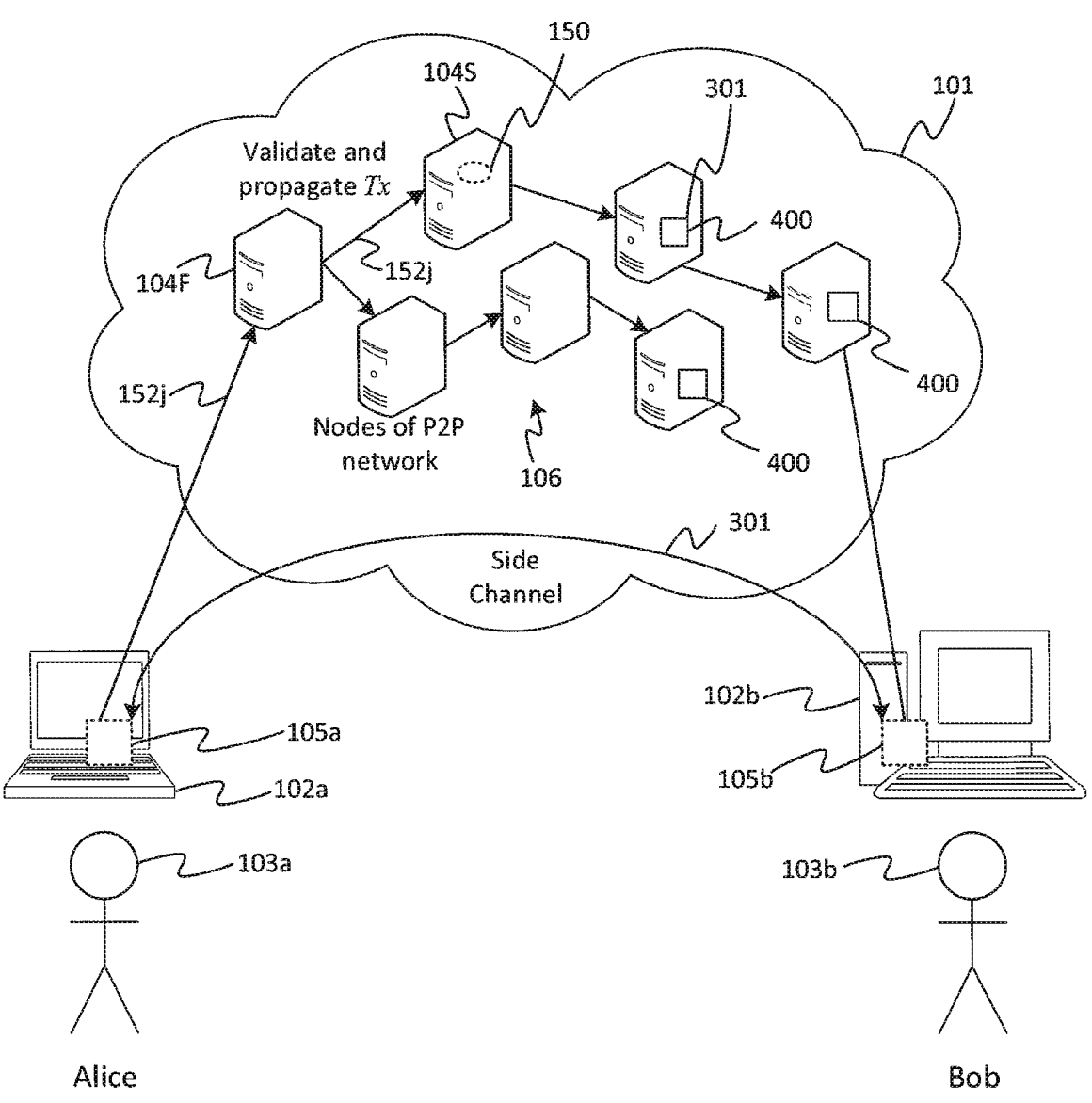
FIG. 3 is a schematic block diagram of another system for implementing a blockchain.

FIG. 3 shows a further system 100 for implementing a blockchain 150. The system 100 is substantially the same as that described in relation to FIG. 1 except that additional communication functionality is involved. The client application on each of Alice and Bob's computer equipment 102a, 120b, respectively, comprises additional communication functionality. That is, it enables Alice 103a to establish a separate side channel 301 with Bob 103b (at the instigation of either party or a third party). The side channel 301 enables exchange of data separately from the P2P network. Such communication is sometimes referred to as "off-chain". For instance this may be used to exchange a transaction 152 between Alice and Bob without the transaction (yet) being published onto the network P2P 106 or making its way onto the chain 150, until one of the parties chooses to broadcast it to the network 106. Alternatively or additionally, the side channel 301 may be used to exchange any other transaction related data, such as keys, negotiated amounts or terms, data content, etc.

The side channel 301 may be established via the same packet-switched network 101 as the P2P overlay network 106. Alternatively or additionally, the side channel 301 may be established via a different network such as a mobile cellular network, or a local area network such as a local wireless network, or even a direct wired or wireless link between Alice and Bob's devices 1021, 102b. Generally, the side channel 301 as referred to anywhere herein may comprise any one or more links via one or more networking technologies or communication media for exchanging data "off-chain", i.e. separately from the P2P overlay network 106. Where more than one link is used, then the bundle or collection of off-chain links as a whole may be referred to as the side channel 301. Note therefore that if it is said that Alice and Bob exchange certain pieces of information or data, or such like, over the side channel 301, then this does not necessarily imply all these pieces of data have to be send over exactly the same link or even the same type of network.

Node Software

Figure 4:
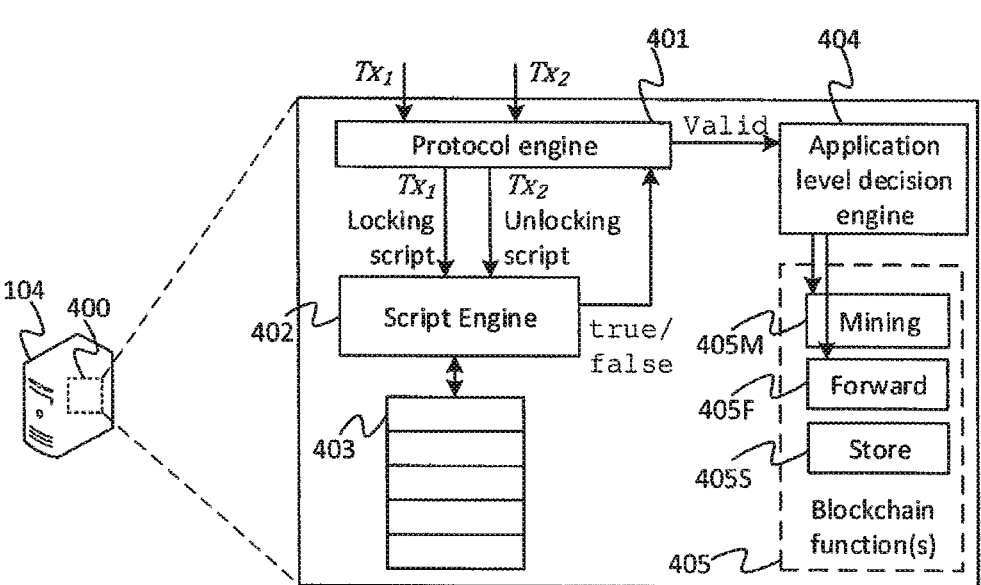
FIG. 4 is a schematic block diagram of a piece of node software for processing transactions in accordance with a node protocol of an output-based model.

FIG. 4 illustrates an example of the node software 400 that is run on each node 104 of the P2P network 106, in the example of a UTXO- or output-based model. The node software 400 comprises a protocol engine 401, a script engine 402, a stack 403, an application-level decision engine 404, and a set of one or more blockchain-related functional modules 405. At any given node 104, these may include any one, two or all three of: a mining module 405M, a forwarding module 405F and a storing module 405S (depending on the role or roles of the node). The protocol engine 401 is configured to recognize the different fields of a transaction 152 and process them in accordance with the node protocol. When a transaction 152m ($Tx_m$) is received having an input pointing to an output (e.g. UTXO) of another, preceding transaction 152m−1 ($Tx_{m-1}$), then the protocol engine 401 identifies the unlocking script in $Tx_m$ and passes it to the script engine 402. The protocol engine 401 also identifies and retrieves $Tx_{m-1}$ based on the pointer in the input of $Tx_m$. It may retrieve $Tx_{m-1}$ from the respective node's own pool 154 of pending transactions if $Tx_{m-1}$ is not already on the blockchain 150, or from a copy of a block 151 in the blockchain 150 stored at the respective node or another node 104 if $Tx_{m-1}$ is already on the blockchain 150. Either way, the script engine 401 identifies the locking script in the pointed-to output of $Tx_{m-1}$ and passes this to the script engine 402.

The script engine 402 thus has the locking script of $Tx_{m-1}$ and the unlocking script from the corresponding input of $Tx_m$. For example $Tx_1$ and $Tx_2$ are illustrated in FIG. 4, but the same could apply for any pair of transactions, such as $Tx_0$ and $Tx_1$, etc. The script engine 402 runs the two scripts together as discussed previously, which will include placing data onto and retrieving data from the stack 403 in accordance with the stack-based scripting language being used (e.g. Script).

By running the scripts together, the script engine 402 determines whether the unlocking script meets the one or more criteria defined in the locking script—i.e. does it "unlock" the output in which the locking script is included? The script engine 402 returns a result of this determination to the protocol engine 401. If the script engine 402 determines that the unlocking script does meet the one or more criteria specified in the corresponding locking script, then it returns the result "true". Otherwise it returns the result "false".

In an output-based model, the result "true" from the script engine 402 is one of the conditions for validity of the transaction. Typically there are also one or more further, protocol-level conditions evaluated by the protocol engine 401 that must be met as well; such as that the total amount of digital asset specified in the output(s) of $Tx_m$ does not exceed the total amount pointed to by the input(s), and that the pointed-to output of $Tx_{m-1}$ has not already been spent by another valid transaction. The protocol engine 401 evaluates the result from the script engine 402 together with the one or more protocol-level conditions, and only if they are all true does it validate the transaction $Tx_m$. The protocol engine 401 outputs an indication of whether the transaction is valid to the application-level decision engine 404. Only on condition that $Tx_m$ is indeed validated, the decision engine 404 may select to control one or both of the mining module 405M and the forwarding module 405F to perform their respective blockchain-related function in respect of $Tx_m$. This may comprise the mining module 405M adding $Tx_m$ to the node's respective pool 154 for mining into a block 151, and/or the forwarding module 405F forwarding $Tx_m$ to another node 104 in the P2P network 106. Note however that in embodiments, while the decision engine 404 will not select to forward or mine an invalid transaction, this does not necessarily mean that, conversely, it is obliged to trigger the mining or the forwarding of a valid transaction simply because it is valid. Optionally, in embodiments the decision engine 404 may apply one or more additional conditions before triggering either or both functions. E.g. if the node is a mining node 104M, the decision engine may only select to mine the transaction on condition that the transaction is both valid and leaves enough of a mining fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model (not illustrated in FIG. 4), a result of "true" could be indicated by a combination of an implicit, protocol-level) validation of a signature by the node 104 and an additional affirmative output of a smart contract (the overall result being deemed to signal true if both individual outcomes are true).

Preliminaries

Public-Key Encryption

Public key cryptography (PKC) utilises encryption schemes that provide confidentiality and digital signature schemes that provide authenticity and non-repudiation.

Public-key encryption allows confidential communication between any pairs of players in a large group (and especially in the absence of a private channel to exchange keys). Each player will have a pair of keys; a secret private key that is used for decryption and a corresponding public key that is made public and used for encrypting messages sent to that player. For a player Alice, her private key can be given by $sk_{Alice}$, and her public key $PK_{Alice}$. Any player who wants to send a confidential message, m, to Alice, will use Alice's public key $PK_{Alice}$ to encrypt the message and produce a ciphertext, c. That ciphertext should only be decryptable back to plaintext using $sk_{Alice}$.

$$c=E(m,PK_{Alice})$$

$$m=D(c,sk_{Alice})$$

For such a system to be realized, encryption should involve the use of a trapdoor one-way function. A one-way function is a function that is easy to calculate in one direction $x \rightarrow f(x)$ and infeasible to inverse $f(x) \rightarrow x$, i.e.

knowing x, it is easy to find $f(x)$, whereas knowing $f(x)$, it is computationally infeasible to find x. Whereas in a trapdoor one way function, it is easy to find x, only with knowledge of extra information (trapdoor) so $f(x, trapdoor) \rightarrow x$ is feasible. In general, the infeasibility is based on well-studied mathematical problems that are believed to be computationally hard.

Prior to public-key encryption, symmetric key encryption was used to provide confidential communication. In symmetric key encryption, the communicating parties would share one secret key that would be used for both encrypting and decrypting messages. Public-key encryption is also known as asymmetric key encryption. A public-key encryption scheme generally comprises:

Key Generation

Alice generates a private key, $sk_{Alice}$, from a random pool.

Alice derives her public key, $PK_{Alice}$, from the private key and publishes it to all parties.

Encryption

Any party member uses $PK_{Alice}$ to encrypt a message m, $$c=E(m,PK_{Alice})$$

Decryption

To decrypt the message, Alice uses her private key, $sk_{Alice}$, $$m=D(c,sk_{Alice})$$

For a public-key encryption scheme to be secure it has to satisfy many more requirements than a symmetric key cryptosystem. These requirements include that it should be computationally infeasible to derive $sk_{Alice}$ from $PK_{Alice}$, and it should be computationally infeasible to know m given c, even if the attacker can calculate c for any m.

Due to these extra requirements, it is much harder to design a secure and practical public-key encryption scheme than a symmetric one. In general, public-key encryption keys are several times larger than those of a symmetric key to reach the same level of security. In addition to that, encryption and decryption algorithms are slower than those of symmetric cryptosystems. In practical systems, symmetric key encryption is used to encrypt data, whereas public-key encryption is used at the beginning to exchange a symmetric key to be used.

Digital Signatures

A trapdoor one-way function can be used to construct a digital signature scheme. In a digital signature setting, each player will have their own secret private key to be used for signing, and a corresponding public key that is used for verification. A digital signature scheme comprises:

Key Generation

Alice generates a private key, $sk_{Alice}$, from a random pool.

Alice derives her public key, $PK_{Alice}$, from the private key and publishes it to all parties.

Signing

Alice signs a message, m, using her private key, $sk_{Alice}$, to obtain the signature s, $$s=Sign(m,sk_{Alice}),$$

Signature Verification

Any party, can validate the signature by running:

$$Verify(m,s,PK_{Alice})$$

Note that the above system provides authenticity, non-repudiation and integrity. This is because no one except the owner of the private key can select a message and then sign it and produce a signature linked to corresponding public key. The system provides integrity because if m or s is changed, the validation would fail.

Public-Key Infrastructure (PKI)

PKC, to a large extent, solved the problem of secret sharing in symmetric-key settings. However, there remains a problem, which is how to ensure that the public key of Alice belongs to Alice. If it is inadvertently corrupted or any malicious player was able to replace Alice's public key with their own, they will be able to decrypt all messages that were meant for Alice and encrypted by the malicious player public key. Moreover, there is no easy way for any other player to distinguish between Alice's real key and that of the malicious player since, In general, $PK_{Alice}$ is at least 500 bits of random-looking string.

This problem can be partially avoided using digital certificates and PKI. A digital certificate mainly comprises a message that contains Alice's public key and Alice's identifier. The hash of these fields is signed by a certificate authority (CA). A certificate authority is a trusted third party, whose public key is known by all party members and fully trusted. Thus, any party member can easily validate that the certificate is indeed signed by the CA. The CA would be responsible for assuring that Alice's public key indeed belongs to Alice. If Alice can prove her public key using a certificate from a known CA, she can then use her public key to receive encrypted messages, or even to issue certificates to other players.

For practical systems, there is a single certificate authority whose public key can be known to all members of the group. This CA can provide certificates for other CAs, who in turn can issue certificates for other players. As an example, web browsers have pre-installed certificates of a number of CAs. Any of these certificates can act as a root of trust for any https server. If the certificate provided by the server does not have a valid root of trust to a CA, the browser can warn the user that it cannot verify that the certificate belongs to the visited https server. A known standard for certificates is referred to as X.509. It includes the following fields:

Version
Validity period (valid from and valid to)
Certificate issuer
Public-key type, length and value
Usage (e.g. can the certificate be used to sign other certificates)
Hash type and value, etc.
Subject Identity-Based Encryption (IBE)

Identity-based encryption per se was proposed in the early eighties. An IBE scheme is a public-key encryption scheme where the encryption key is an arbitrary string such as an email, or a mobile phone number. In such a system, it is enough to know Alice's email address to send her an encrypted message. There is no need for a certificate authority, or a pre-communication with Alice to get her public key.

A typical IBE system would still have to have a trusted third party, commonly referred to as a "private key generator" (PKG). An IBE scheme utilises the following algorithms:

Master Key Generation
PKG generates a master private key, $sk_{master}$, from a random pool.
PKG derives its own public key, $PK_{master}$, from the private key and publishes $PK_{master}$ to all parties.

Subscribers Key Generation
Alice selects her public key (e.g. her email address, mobile phone number, etc.), $ID_{Alice}$, and requests a private key (i.e. a decryption key) from the PKG.
PKG generates Alice's private key, $sk_{Alice}$, from the master private key, $sk_{master}$, and Alice's public key, $ID_{Alice}$, and sends $sk_{Alice}$ to Alice through a secure channel.

Encryption
Any party that wants to communicate a message, m, with Alice securely can use Alice's public key, $ID_{Alice}$, using $$c=E(m,ID_{Alice})$$

Decryption
Alice uses her private key, $sk_{Alice}$, to decrypt messages $$m=D(c,sk_{Alice})$$

In IBE the PKG knows all the private keys of all users. In certain applications, this may be acceptable. For example, a company can use IBE to allow confidentiality for its employees and would want to be able to access their encrypted data, delegate or revoke access by controlling their private keys.

It is also possible to design an IBE with more than one PKG. As long as all PKGs do not collude to reveal Alice's private key, Alice would be the only one who possesses her decryption key. The system would require at least one honest PKG.

In secure communication applications IBE is used to exchange keys of a symmetric encryption system. IBE is proposed to be used in applications where a fast-call-setup is required such as use by emergency services.

As the IBE algorithms above indicate, the private key, $sk_{Alice}$, is calculated by a trusted third party, PKG, and passed on to the user. There is no guarantee that the PKG is not going to use the private key later. Assuming the PKG is fully trusted, it still acts as a single point of failure on the security chain from an attacker's point of view. Therefore, if key escrow can be removed from IBE, the security vulnerability of such an IBE system can be reduced without losing any benefits.

Bilinear Mappings

Let $G_1$ and $G_2$ be two groups of order q for some large prime q. A Boneh-Franklin IBE scheme (BF-IBE) uses a bilinear map e: $G_1 \times G_1 \rightarrow G_2$ between these two groups. The map must satisfy the following properties:

1. Bilinear: A map e: $G_1 \times G_1 \rightarrow G_2$ is bilinear if $$e(aP,bQ)=e(P,Q)^{ab}$$

for all P, $Q \in G_1$ and all a, $b \in \mathbb{Z}_q$.

2. Non-degenerate: The map does not send all pairs in $G_1 \times G_1$ to the identity in $G_2$. Observe that since $G_1$, $G_2$ are groups of prime order this implies that if P is a generator of $G_1$ then e(P, P) is a generator of $G_2$.

3. Computable: There is an efficient algorithm to compute e(P, Q) for any P, $Q \in G_1$ For any bilinear mapping that satisfies the above properties, the discrete log problem in $G_1$ is no harder than the discrete log problem in $G_2$. In BF-IBE, $G_1$ is a subgroup of the additive group of points of an elliptic curve $E/F_p$. The group $G_2$ is a subgroup of the multiplicative group of a finite field $F^*_{p^2}$.

Boneh-Franklin IBE

The following describes a BF-IBE scheme with a single trusted third party (TTP) acting as a PKG. Assume the following parameters are used by the PKG:

1. a pair of groups $(G_1, G_2)$ of prime order q;
2. a bilinear pairing e: $G_1 \times G_1 \rightarrow G_2$;
3. a generator point $P \in G_1$; and
4. four hash functions $H_1$: $\{0, 1\}^* \rightarrow G^*_1$, $H_2$: $G_2 \rightarrow \{0, 1\}^n$, $H_3$: $\{0, 1\}^n \times \{0, 1\}^n \rightarrow \mathbb{Z}^*_q$, $H_4$: $\{0, 1\}^n \rightarrow \{0, 1\}^n$.

Note that $\{0, 1\}^*$ denotes a binary string of arbitrary length, $\{0, 1\}^n$ denotes a binary string of length n, and $G^*_1$ is $G_1$ without the identity element. Thus $H_1$ is any function that takes $\{0, 1\}^*$ as an input and outputs an element in $G^*_1$. $H_3$ is a function that maps a pair of binary strings each of length n, to an element in $\mathbb{Z}^*_q$. $\mathbb{Z}^*_q$ is the multiplicative group of order q consisting of the elements in $Z_q \backslash \{0\}$, i.e., without the additive identity element.

Setup [Algorithm 1A]

A PKG runs this algorithm once:
1. Pick a random number $s \in \mathbb{Z}^*_q$.
2. Calculate $P_{pub} = s \cdot P$ s is the master secret, should be known only to PKG, and have a high quality of randomness. s may be obtained using a cryptographically secure pseudorandom generator (CSPRG).

Key Generation [Algorithm 2A]

Given a user identity, $ID_A$, a PKG runs this algorithm using the secret key, s:
1. Compute $Q_A = H_1(ID_A)$, a point in $G_1$.
2. Return $D_A = s \cdot Q_A$.
3. The PKG sends $D_A$ to the user over a secure channel.
4. The user's public key is $ID_A$.
5. The user's private key is $D_A$.

Encrypt [Algorithm 3A]

Given an identity, $ID_A$, and the PKG's public key, $P_{pub}$, to encrypt a message $m \in \{0, 1\}^n$, anyone can perform the following:
1. Compute $Q_A = H_1(ID_A)$.
2. Pick a random number of n bits, $\sigma$.
3. Compute $r = H_3(\sigma, m)$.
4. Compute the ciphertext c as a triplet (U, V, W):
   a. $U = r \cdot P$,
   b. $V = \sigma \oplus H_2(e(Q_A, P_{pub})^r)$,
   c. $W = m \oplus H_4(\sigma)$.

Decrypt [Algorithm 4A]

To decrypt a ciphertext c=(U, V, W), the user use their private key, $D_A$, and the following algorithm:
1. Compute $\sigma' = V \oplus H_2(e(D_A, U))$.
2. Compute $m' = W \oplus H_4(\sigma')$.
3. Compute $r' = H_3(\sigma', m')$.
4. Check the equality $r' \cdot P = U$.
5. Return m'.

Note that $e(Q_A, P_{pub})^r = e(Q_A, s \cdot P)^r = e(Q_A, P)^{sr} = e(s \cdot Q_A, r \cdot P) = e(D_A, U)$.

Updating the user's private keys implies that the user's public keys should be updated too. Since the public key is expected to be a constant string ID (email, mobile number), for each user, key updating can be achieved by having the public key as a concatenation of an identifier constant string with a variable string. The variable string may represent the validity period, e.g. a time stamp.

Multi-PKG Boneh-Franklin IBE

The above IBE scheme can be generalised to have more than one PKG to allow the required trust to be distributed over several PKGs, thus reducing the reliance on each individual PKG. Also, the user (i.e. the owner of the identity) is now included as part of the PKG group, thus removing the problem of key escrow.

Assume the following parameters are used by the PKGs:
1. a pair of groups $(G_1, G_2)$ of prime order q;
2. a bilinear pairing e: $G_1 \times G_1 \rightarrow G_2$;

3. a generator point $P \in G_1$; and
4. four hash functions $H_1$: $\{0, 1\}^* \rightarrow G_1$, $H_2$: $G_2 \rightarrow \{0, 1\}^n$, $H_3$: $\{0, 1\}^n \times \{0, 1\}^n \rightarrow \mathbb{Z}^*_q$, $H_4$: $\{0, 1\}^n \rightarrow \{0, 1\}^n$.

Setup [Algorithm 1B]

Each PKG runs this algorithm independently once:
1. Pick a random number $s_i \in \mathbb{Z}^*_q$.
2. Calculate $P_i = s_i \cdot P$
3. Add $P_i$ to the parameters.

Key Generation [Algorithm 2B]

Given a user identity, $ID_A$, each PKG runs this algorithm independently using their partial secret key, $s_i$:
1. Compute $Q_A = H_1(ID_A)$, a point in $G_1$.
2. Return $D_{iA} = s_i \cdot Q_A$ the owner of $ID_A$ over a secure channel.

When the user has received $D_{iA}$ from each PKG, the user runs the following algorithm:
1. Pick a random number $x_A \in \mathbb{Z}^*_q$.
2. Compute $s_A = x_A \cdot \Sigma_i D_{iA}$.
3. Compute $X_A = x_A \cdot P$.
4. Compute $Y_A = x_A \cdot \Sigma_i P_i$.
5. The private key is $s_A$.
6. The partial public key is $(X_A, Y_A)$.

Encrypt [Algorithm 3B]

Given an identity, $ID_A$, and a public key $(X_A, Y_A)$, the partial public key can be verified before encrypting a message by checking for this equality:

$$e\left(X_A, \sum_i P_i\right) = e(P, Y_A)$$

This equality checks the dependency between the public key of the user and the public keys of the PKGs, i.e. it verifies which PKG parameters are used by Alice. However, it does not verify that $ID_A$ and $(X_A, Y_A)$ both belong to Alice.

To encrypt a message m with a complete identity-based public key $(ID_A, X_A, Y_A)$, both $ID_A$ and $Y_A$ are required to run the following algorithm:
1. Compute $Q_A = H_1(ID_A)$.
2. Pick a random number of n bits, $\sigma$.
3. Compute $r = H_3(\sigma, m)$.
4. Compute the ciphertext c=(U, V, W), as a triplet:
   a. $U = r \cdot P$,
   b. $V = \sigma \oplus H_2(e(Q_A, Y_A)^r)$,
   c. $W = m \oplus H_4(\sigma)$.

Normally in PKI, a user's public key is signed by a CA, in which case the verification of the user's public key is essentially a verification of a digital signature signed by the CA. In the present case, the verification is two bilinear pairings and one equality check. Furthermore, as users are allowed to generate their own secrete value, as a trade-off, a public key $(X_A, Y_A)$ must be introduced in addition to their identity $ID_A$. Depending on different scenarios, this trade-off can be crucial as it solves the key-escrow problem, i.e. the problem of trust.

Note also that $X_A$ and $\Sigma_i P_i$ are not used in the encryption algorithm. They are instead used in checking that $X_A$ and $Y_A$ are generated from the same trusted PKG parameters. Note that if an eavesdropper ("Eve") claimed to be Alice and sent Bob $(X_E, Y_E)$, which she got after subscribing with the same PKGs, they would pass this check, but decryption would fail because of $Q_A$ used by Bob. Eve can succeed in pretending to be Alice if she's able to change the PKG parameters, specifically $\Sigma_i P_i$, however, it is assumed for the present disclosure that the PKG parameters can be obtained and have their authenticity and integrity checked in a secure manner by all parties. Thus, Eve would not be able to succeed in this attack.

In the case of having the user as a PKG, it is enough for a secure system to have a single PKG with Alice. That is, one key share is generated by a PKG and the other key share is generated by the user.

Decrypt [Algorithm 4B]

To decrypt a ciphertext c=(U, V, W), the private key, $s_A$, is required to run the following algorithm:

1. Compute $\sigma'=V\oplus H_2(e(s_A, U))$.
2. Compute $m'=W\oplus H_4(\sigma')$.
3. Compute $r'=H_3(\sigma', m')$.
4. Check the equality $r'\cdot P=U$.
5. Return m'.

Note that if the decryption succeeds, $\sigma'=\sigma$, $m'=m$, and $r'=r$, as in the encryption.

Identity-Based Public Key Generation Protocol

Embodiments of the present disclosure provide for an identity-based public-key generation protocol, or equivalently, an identity-based encryption-key generation protocol. In particular, an identity-based public/encryption key is generated for a user based on a personal identifier of that user, thus tying the key to the user's identity. The personal identifier may comprise one or more of: a name and/or address, an email address, a phone number, a passport number, a driving license number, a national insurance number, a social media profile, a birth date, etc. The personal identifier may also be an attribute, such as being a member of a certain group, e.g. police officer, or working in a certain department e.g. HR, or working in a certain project, or having Security clearance. Note that in the example of being a member of a group, then any member of the group may be able to decrypt a message encrypted with the identity-based public key, unless other identifiers or attributes are also used. For instance, each members of the same group may be given access to the private key corresponding to the identity-based public key.

Figure 5:
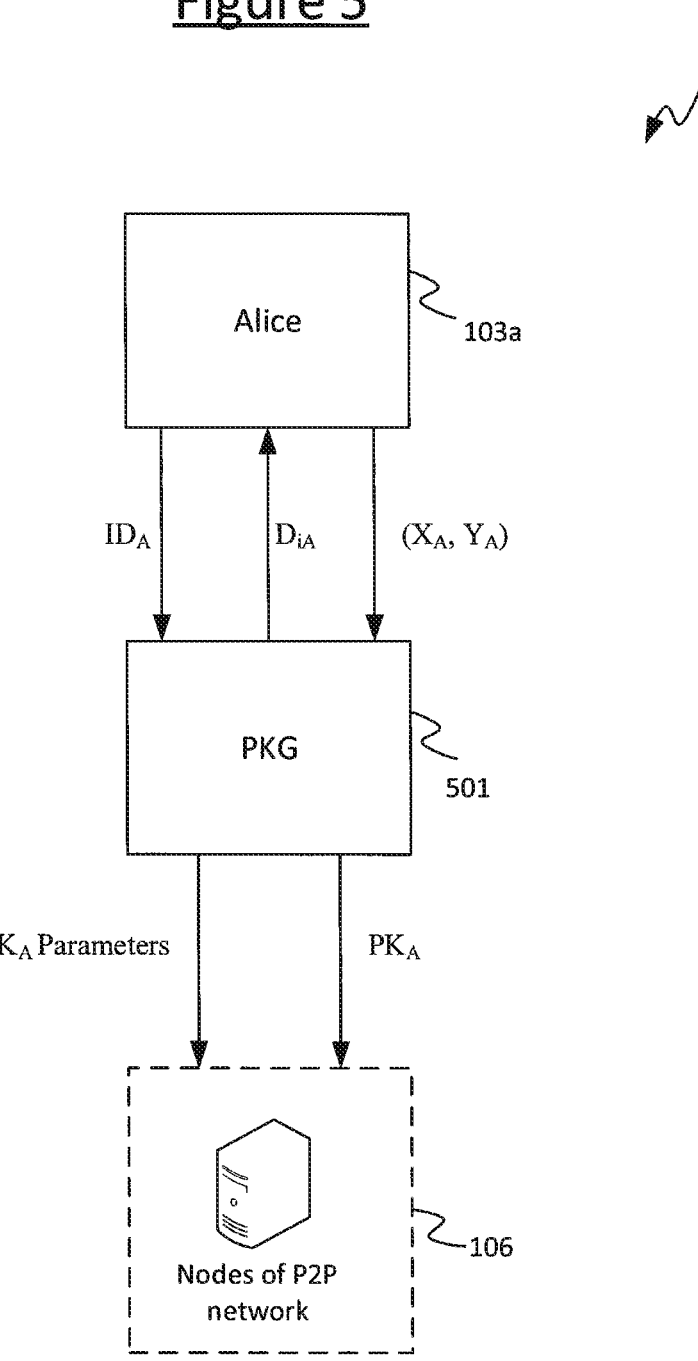
FIG. 5 is a schematic block diagram of an example system for generating a public key based on a party's identifier.

FIG. 5 illustrates an example system 500 for implementing embodiments of the present disclosure. The example system comprises a user (Alice) 103a, a key generator 501 and a network of P2P blockchain nodes 106. In some embodiments, the system 500 may comprise multiple key generators 501. Preferably, one, some or all key generators 501 are configured to perform an identity verification check on Alice 103a, meaning that a key generator 501 can verify an identifier as belonging to Alice 103a. For instance, a key generator may perform an identity check as part of a know your customer (KYC) protocol.

The computer equipment of Alice 103a and the blockchain nodes 104 have been described above with reference to FIGS. 1 to 4 and therefore will not be described in further detail here. Each key generator 501, also referred to as private key generators (PKGs) comprises respective computer equipment. The computer equipment of each PKG 501 comprises respective processing apparatus comprising one or more processors, e.g. one or more CPUs, GPUs, other accelerator processors, application specific processors, and/or FPGAs. The computer equipment of each PKG 501 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment of each PKG 501 stores software comprising a respective instance of at least one client application arranged to run on the processing apparatus. It will be understood that any action attributed herein to a given PKG 501 may be performed using the software run on the processing apparatus of the respective computer equipment. The computer equipment of a given PKG 501 may comprise at least one user terminal, e.g. a desktop or laptop computer, a tablet, a smartphone, or a wearable device such as a smartwatch. Additionally or alternatively, the computer equipment of a given PKG 501 may comprise a server comprising one or more physical server units, or even whole a data centre. The computer equipment of a given PKG 501 may also comprise one or more other networked resources, such as cloud computing resources accessed via the user terminal.

In some examples, one, some or all of the PKGs may be mining nodes 104M, in which case the computer equipment of those PKGs is the computer equipment of the mining nodes 104M as described above.

In the example shown in FIG. 5, Alice 103a transmits an identifier $ID_A$ to a PKG 501. Alice 103a may transmit the identifier directly to PKG 501 via a wired or wireless connection, e.g. via a secure channel 301 as described with reference to FIG. 3. Alice 103a may instead transmit the identifier $ID_A$ to PKG 501 via a blockchain transaction, e.g. payable to an address of PKG 501. For instance, Alice 103a may generate a blockchain transaction that has a (spendable or unspendable) output that comprises the identifier $ID_A$. If the identifier $ID_A$ is already known to PKG 501, Alice 103a need not send the identifier. For example, Alice's identifier $ID_A$ may be publicly known.

The PKG 501 generates a private key share $D_{iA}$ based on the identifier $ID_A$, i.e. the private key share $D_{iA}$ is a function of the identifier $ID_A$. The PKG 501 may transmit the private key share $D_{iA}$ to Alice, e.g. via the secure channel, via a blockchain transaction, e.g. payable to an address of Alice 103a, or via an alternative method. The private key share $D_{iA}$ may be sent in an encrypted form. For instance, Alice 103a may have a public key (a "first public key") known to PKG 501, e.g. Alice may have a first public key for use as the basis of the address on the blockchain network. The first public key may be a certified public key, e.g. certified by PKG 501 or by a separate certificate authority.

In some examples, Alice 103a may also generate her own respective private key share $D_{iA}$ using the same protocol as PKG 501. Here, the same protocol means the same algorithm, which will involve one or more different variables in order to generate different private key shares.

As an example, PKG 501 and Alice 103a may generate respective private key shares using the algorithms described above, in particular, Algorithm 1B and Algorithm 2B.

Once Alice 103a has obtained (e.g. received, and optionally, generated) a set of private key shares $D_{iA}$, Alice 103a generates an identity-based private key $s_A$. The identity-based private key $s_A$ is generated based on the set of private key shares $D_{iA}$, i.e. the identity-based private key $s_A$ is a function of the set of private key shares $D_{iA}$. Alice 103a may generate the identity-based private key $s_A$ using the key generation algorithm described above, i.e. Algorithm 2B.

Alice 103a also generates a partial identity-based public key $(X_A, Y_A)$. This key is partial in the sense that it does not correspond to the identity-based private key $s_A$, i.e. the identity-based private key $s_A$ would not decrypt a message encrypted with the partial identity-based public key $(X_A, Y_A)$. Alice may generate the partial identity-based public key using the key generation described above, i.e. Algorithm 2B. The partial identity-based public key $(X_A, Y_A)$ is generated based on (i.e. is a function of) a set of public key shares $P_i$ that correspond to the set of private key shares $D_{iA}$. Here, each public key share $P_i$ corresponds to a respective private key share $D_{iA}$ in the sense that the public key share $P_i$ is generated based on the respective private key share $D_{iA}$, i.e. a public key share $P_i$ is a function of a private key share $D_{iA}$.

Alice 103a may transmit the partial identity-based public key $(X_A, Y_A)$ to PKG 501, e.g. via a secure channel, via a blockchain transaction, e.g. payable to the address of PKG 501, or via alternative means. In that case, PKG 501 generates the (complete) identity-based public key $PK_A$. The identity-based public key $PK_A$ is based on (i.e. is a function of) the identifier $ID_A$ and the partial identity-based public key $(X_A, Y_A)$. Additionally or alternatively, Alice 103a may herself generate the identity-based public key $PK_A$. Preferably PKG 501 can perform an identity verification check on Alice 103a and her identifier $ID_A$, in which case it is preferable for PKG 501 to generate the identity-based public key $PK_A$, assuming the identity verification check is successful.

Once the identity-based public key $PK_A$ has been generated, Alice 103a and/or PKG 501 generates a blockchain transaction that includes an output comprising the identity-based public key $PK_A$. The output may be a spendable output, e.g. a pay-to-public-key-hash (P2PKH) output, or it may be an unspendable output, e.g. an OP_RETURN output. Preferably PKG 501 generates the blockchain transaction so that other parties can rely on PKG's identity verification check when using Alice's identity-based public key $PK_A$.

The blockchain transaction (referred to below as a "validity check transaction") $Tx_{VCT}$ is sent to one or more nodes of the blockchain network 106 to be included in the blockchain 150. Preferably, PKG 501 transmits the validity check transaction $Tx_{VCT}$ to the blockchain network 106. Alternatively, Alice 103a may transmit the validity check transaction $Tx_{VCT}$ to the blockchain network 106. The party that generates the transmits the validity check transaction $Tx_{VCT}$ may or may not be the same party who transmits the transmits the validity check transaction $Tx_{VCT}$ to the blockchain network 106. For instance, Alice 103a may generate $Tx_{VCT}$ and then forward it to PKG 501 for transmission to the blockchain network 501.

In examples where PKG 501 generates the identity-based public key $PK_A$, PKG 501 may directly transmit the identity-based public key $PK_A$ and/or the validity check transaction $Tx_{VCT}$ to Alice 103a, e.g. over a secure channel. The identity-based public key $PK_A$ may be sent in an encrypted form, e.g. encrypted with Alice's first public key.

Alice 103a may obtain the identity-based public key $PK_A$, e.g. from PKG 501 or from the blockchain 150 for use, e.g. as an encryption key. Use of the identity-based public key $PK_A$ will be described below. PKG 501 may transmit a transaction identifier $TxID_{VCT}$ of the validity check transaction $Tx_{VCT}$ to Alice 103a so that she can easily identity the validity check transaction $Tx_{VCT}$ on the blockchain 150.

Alice 103a and/or PKG 501 may generate a blockchain transaction (referred to below as a parameter transaction) $Tx_{par}$ comprises the parameters used to generate the identity-based public key $PK_A$, e.g. the parameters of Algorithm 1B and 2B. Private and secret keys and not included in the parameter transaction $Tx_{par}$. The parameter transaction $Tx_{par}$ is transmitted to the blockchain network 106 by Alice 103a and/or the PKG 501. The parameter transaction $Tx_{par}$ may or may not be the same transaction as the validity check transaction $Tx_{VCT}$, and the party that generates the parameter transaction $Tx_{par}$ may or may not be the same party that generates the validity check transaction $Tx_{VCT}$. The parameters enable third parties to verify the identity-based public key $PK_A$ and encrypt messages using the identity-based public key $PK_A$. The parameters also enable Alice 103a to decrypt messages that have been encrypted using the identity-based public key $PK_A$. The parameters may be published without using the blockchain 150. For instance, the parameters may be published on a website (hosted) by Alice 103a and/or PKG 501. Instead of publishing the parameters they may be sent to parties on request.

If the parameter transaction $Tx_{par}$ and the validity check transaction $Tx_{VCT}$ are different transactions, the parameter transaction $Tx_{par}$ may comprise the transaction identifier $TxID_{VCT}$ of the validity check transaction $Tx_{VCT}$, e.g. so that Alice 103a or third parties can identity the identity-based public key $PK_A$ stored in the validity check transaction $Tx_{VCT}$.

In examples where PKG 501 is a mining node 104M, the parameter transaction $Tx_{par}$ may be a generation transaction (also known in the art as a coinbase transaction). Generation transactions have been described above. In these examples, sending the parameter transaction $Tx_{par}$ to the blockchain network 106 means mining a new block 151 comprising the parameter transaction $Tx_{par}$. Only a mining node 104M can generate generation transactions as part of the block mining process. To mine a block requires proof-of-work, which is inherently a computationally expensive process. Therefore it is assumed that a mining node 104M who puts in the required proof-of-work to mine a block having a generation transaction that includes the parameters would not include incorrect parameters as this would be a costly process to them.

The validity check transaction $Tx_{VCT}$ may comprise a spendable output locked to a public key, or public key address of Alice 103a, e.g. Alice's first public key. For example, the output may be a P2PKH output. In order for a P2PKH output to be unlocked by an input of a spending transaction, the input of the spending transaction must comprise a public key which hashes to the P2PKH in the P2PKH output, and a signature generated using that public key, not necessarily in that order. The output may impose one or more additional requirements on the input of the spending transaction.

Alternatively, the validity check transaction $Tx_{VCT}$ may comprise a spendable output locked to a public key, or public key address of PKG 501. For example, the output may be a P2PKH output payable to the public key of PKG 501.

As another alternative, the validity check transaction $Tx_{VCT}$ may comprise a spendable output locked to the public key of Alice 103a and the public key of PKG 501. Depending on the output script, the output may be unlocked if the input of the spending transaction comprises a public key and/or signature of Alice, or the output may be unlocked if the input of the spending transaction comprises a public key of PKG 501, or the output may be unlocked if the input of the spending transaction comprises two public keys (one from Alice 103a and one from PKG 501) and/or two signatures (one from Alice 103a and one from PKG 501). For example, the output may be an m-of-n multi-sig output which may be unlocked if the input of the spending transaction comprises m signatures that correspond to n public keys in the multi-sig output.

In some examples, the spendable output of the validity check transaction $Tx_{VCT}$ may comprise the identity-based public key $PK_A$. Alternatively, the validity check transaction $Tx_{VCT}$ may comprise two outputs, one being the spendable output and one being an unspendable output comprising the identity-based public key $PK_A$.

If the spendable output of the validity check transaction $Tx_{VCT}$ is locked to Alice 103*a* (or rather her public key or public key address), Alice 103*a* may generate a revoke transaction $Tx_{rev}$ which spends that output of the validity check transaction $Tx_{VCT}$. Once transmitted to the blockchain, the revoke transaction $Tx_{rev}$ would remove the output of the validity check transaction $Tx_{VCT}$ comprising the identity-based public key $PK_A$ from the unspent transaction output (UTXO) set of the blockchain 150. Similarly, if the spendable output of the validity check transaction $Tx_{VCT}$ is locked to PKG 501 (or rather the public key or public key address of PKG 501), PKG 501 may generate the revoke transaction $Tx_{rev}$ which spends that output of the validity check transaction $Tx_{VCT}$.

As mentioned above, Alice's identity-based public key $PK_A$ may be used to encrypt a message. In that sense, the identity-based public key $PK_A$ is used as an identity-based encryption key. Whilst these terms are synonymous, for consistency, the key will be referred to as an identity-based public key $PK_A$ throughout the following.

In some examples, Alice 103*a* may herself user the identity-based public key $PK_A$ to encrypt a message. For example, Alice 103*a* may use the encryption algorithm described above to encrypt the message, i.e. Algorithm 3B. Alice 103*a* may store the encrypted message, transmit the encrypted message to one or more different parties (which may include PKG 501), broadcast the encrypted message across a network (e.g. across a private network), publish the encrypted message, e.g. on a public website, or include the encrypted message in a blockchain network for transmission to one or more nodes of the blockchain network 106. For instance, Alice 103*a* may generate a blockchain transaction comprises an output that includes the encrypted message. The encrypted message may form part of the locking script, e.g. it may impose a requirement on the input of a spending transaction to comprise the decrypted message. Of course, only a party with access to the identity-based private key $s_A$ can decrypt the encrypted message, which preferably is only Alice 103*a*.

In other examples, a party other than Alice 203*a* may use the identity-based public key $PK_A$ to encrypt a message. For example, that party may obtain the identity-based public key $PK_A$ from the validity check transaction $Tx_{VCT}$. Alice may obtain the encrypted message, e.g. directly from the encrypting party, from a blockchain transaction, or otherwise. Alice 103*a* may then use the identity-based private key $s_A$ to decrypt the encrypted message to reveal the message. Alice may decrypt the encrypted message using the decryption algorithm described above, i.e. Algorithm 4B. As before, the encrypted message may form part of a locking script of a blockchain transaction, and Alice 103*a* may include the decrypted message in an unlocking script of a spending transaction to unlock the locking script.

Figure 6:
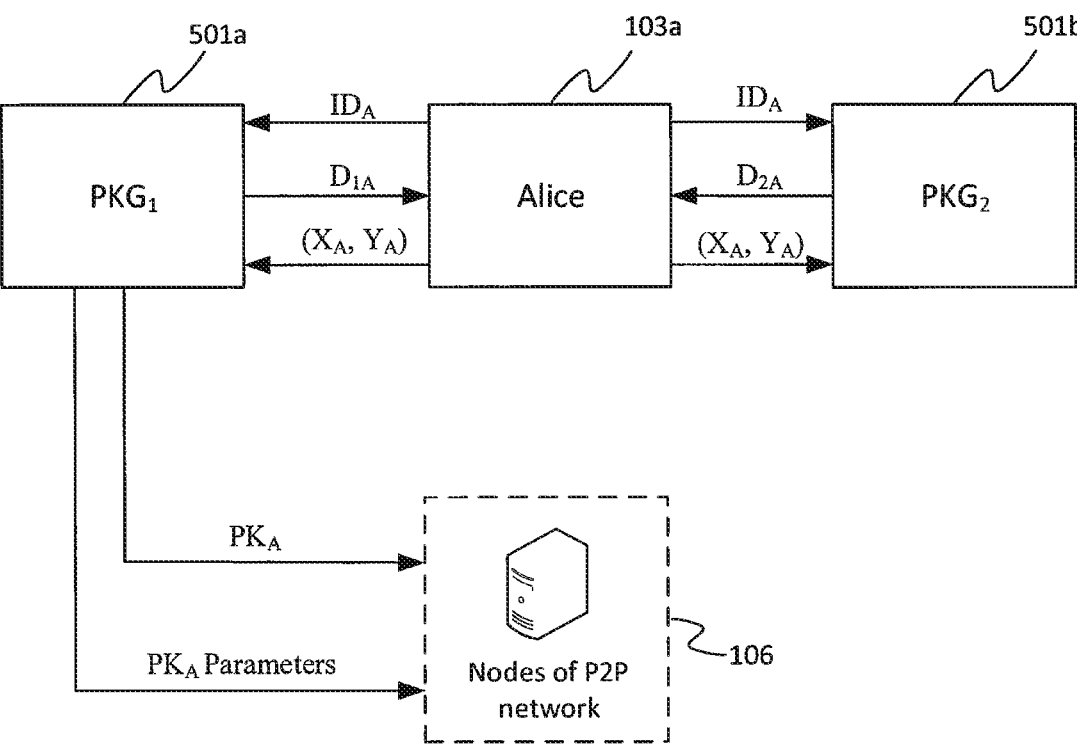
FIG. 6 is a schematic block diagram of another example system for generating a public key based on a party's identifier.

FIG. 6 illustrates another example system 600 for implementing embodiments of the present disclosure. The system 600 of FIG. 6 is similar to the system 500 of FIG. 5 with the addition of another PKG. In the example of FIG. 6 there is a first PKG 501*a* and a second PKG 501*b*. In general, the system may comprise any number of PKGs 501. Both the first PKG 501*a* and the second PKG 501*b* may be configured to perform the actions previously associated with PKG 501 of FIG. 5.

The first PKG 501*a* and/or the second PKG 501*b* may obtain the identifier $ID_A$ from Alice 103*a*. In some examples, one PKG (e.g. PKG 501*a*) may obtain the identifier $ID_A$ and transmit the identifier $ID_A$ to one or more different PKGs (e.g. PKG 501*b*). The first PKG 501*a* and the second PKG

501*b* each generate a respective private key share $D_{iA}$ based on the identifier $ID_A$, the first PKG 501*a* generating a first private key share $D_{1A}$ and the second PKG 501*b* generating a second private key share $D_{2A}$. Each PKG uses the same algorithms to generate their respective private key share $D_{iA}$, except using different variables (e.g. secrets and/or random numbers). Each PKG transmits its respective private key share $D_{iA}$ to Alice 103*a*, who may or may not also generate a respective private key share $D_{iA}$. Each PKG 501 may transmit their respective private key share $D_{iA}$ to Alice 103*a* using the same communication method, e.g. both the first and second PKGs 501*a*, 501*b* may transmit their private key shares $D_{iA}$ over a secure channel, or via different communication methods, e.g. the first PKG 501*a* may include the private key share $D_{1A}$ in a blockchain transaction, and the second PKG may transmit its private key share $D_{2A}$ over a wired connection.

Alice 103*a* uses the first and second private key shares $D_{1A}$, $D_{2A}$ to generate an identity-based private key $s_A$, the identity-based private key $s_A$ being a function of each of the private key shares $D_{iA}$.

Alice 103*a* also generates a partial identity-based public key $(X_A, Y_A)$, i.e. the partial identity-based public key $(X_A, Y_A)$. The partial identity-based public key $(X_A, Y_A)$ is generated based on (i.e. is a function of) a set of public key shares $P_i$ that correspond to the set of private key shares $D_{iA}$. The first PKG 501*a* and the second PKG 501*b* may each transmit their respective public key share $P_i$ to Alice 103*a*, e.g. over a secure channel, or using respective blockchain transactions. Alice 103*a* may transmit the partial identity-based public key $(X_A, Y_A)$ to both the first and second PKGs 501*a*, 501*b*, or she may transmit the partial identity-based public key $(X_A, Y_A)$ to one of the PKGs (e.g. PKG 501*a*) who then forwards it to the other PKGs (e.g. PKG 501*b*). The partial identity-based public key $(X_A, Y_A)$ may be sent in an encrypted form, e.g. encrypted using Alice's first public key.

One, some or all of the PKGs generate the complete identity-based public key $PK_A$ based on the identifier $ID_A$ and the partial identity-based public key $(X_A, Y_A)$. Preferably, only one PKG (e.g. PKG 501*a*) generates a validity check transaction $Tx_{VCT}$ that comprises the identity-based public key $PK_A$, and then transmits that transaction $Tx_{VCT}$ to the blockchain network 106. However, it is not excluded that more than one PKG 501 may generate a respective validity check transaction $Tx_{VCT}$ comprising the identity-based public key $PK_A$. One, some or all of the PKGs may generate the parameter transaction $Tx_{par}$ comprising the (public) parameters used to generate the identity-based public key $PK_A$. Preferably, the PKG that generate the validity check transaction $Tx_{VCT}$ also generates the parameter transaction $Tx_{par}$ which may or may not be the same blockchain transaction.

Embodiments of the present disclosure provide for the implementation of an identity-based encryption (IBE) system, and uses the blockchain 150 and its UTXO set to allow for key revocation key validity checks. The blockchain 150 is leveraged to provide authorisation and integrity when reading IBE keys and parameters. The IBE system is preferably implemented by reputable mining nodes 104M. Each mining node 104M can create a publicly known identity which is secured cryptographically, e.g. as an ECDSA public key, and backed up by a reputation system based on proof-of-work. Assuming each mining node 104M is unwilling to risk their reputation by cheating the system, reputable mining nodes 104M are trusted as to perform checks on the user's identity and validly generate IBE keys. Furthermore, the UTXO set may act as a white list in a PKI setting, whereby a IBE key is valid if it is referenced by a transaction output in the UTXO.

The following sets out another illustrative example embodiment of the present disclosure. Without loss of generality, it is assumed that there are three mining nodes 104M who have provide IBE key generation services. Suppose Alice 103a would like to have her identity Alice@Blockland.com verified and therefore be used as her IBE public key.

Alice contacts all three mining nodes, $M_1$, $M_2$ and $M_3$ for private keys. Each mining node $M_i$ verifies Alice's identity independently. Once they are convinced that Alice 103a is indeed the owner of Alice@Blockland.com, they will follow the following steps:

1. Each mining node runs Key Generation algorithm (Algorithm 2B) on $ID_A$=Alice@Blockland. corn, and sends $D_{iA}$ to Alice 103a.
2. Alice 103a then generates her partial public key ($X_A$, $Y_A$).
3. Upon receiving ($X_A$, $Y_A$) from Alice 103a, each mining node verifies the equality $e(X_A, \Sigma_i P_i)=e(P, Y_A)$
4. If the equality holds, each mining node sets $PK_A=(ID_A, X_A, Y_A)$. If not, the process is stopped.
5. One mining node, or some other relevant party, generates a validity-check transaction having:
   a. INPUT: any valid UTXO of the mining node.
   b. Output 1: P2PKH (an independent public key $PK_{iVCT}$ of the mining node's choice).
   c. Output 2: OP_RETURN $PK_A$
6. When the validity-check transaction is mined, each mining node is given and records the transaction ID $TxID_{iVCT}$.
7. Each mining node creates a coinbase (generation) transaction that contains the following information:
   a. Public key parameters ($G_1$, $G_2$, q, P, $P_1$, $P_2$, $P_3$, e, $H_1$, $H_2$, $H_3$, $H_4$),
   b. Alice's public key $PK_A=(ID_A, X_A, Y_A)$,
   c. VCT identifier $TxID_{VCT}$
8. Each mining node tries to mine the coinbase transaction, if it has not been mined already by other mining nodes.

Once the coinbase transaction is mined, Alice's IBE public key can be used. Note that the information in the transaction generated in step 7 needs to be included only once in a coinbase transaction mined by any of the mining nodes. Once it is mined, other miners do not need to include the same information in further transactions.

Revocation of keys can be achieved by spending the validity check transaction i.e. removing it from the UTXO set. This leads to the immediate revocation of keys and can be done by users, key generators, a trusted third party or a combination of them. Also, another part, say Bob 103b, can easily check if Alice's IBE keys are valid or not by simply checking her details in the UTXO set. Note that more than one mining node 104M may generate a respective validity check transaction. This would allow for configurable revocation rules. For instance, if there are three validity check transactions, one rule may stipulate that it is enough for one of the three validity check transactions to be spent in order for the IBE key to be deemed to be revoked. A different rule may stipulate that all three of the validity check transactions must be spent in order for the IBE key to be deemed to be revoked.

As an alternative to step 5, the Alice's IBE key $PK_A$ can be inserted in the locking script of a transaction using OP_PUSHDATA and OP_DROP instead of OP_RETURN.

This would guarantee that the $PK_A$ would always be in the UTXO and will not be pruned as might happen with OP_RETURN outputs.

Key generation services can be provided by the mining nodes, as described above. It can also be provided by non-miners. Non-mining nodes may run a smart-contract that generates private keys for subscribers, e.g. Alice 103a. The key generation public parameters are published on the blockchain and would benefit from the immutability of the blockchain. Note that Alice 103a would have to let Bob 103b know which key generation service providers that she is using.

With the increasing number of blockchain users, it will become necessary to efficiently store information on the blockchain and to avoid time delays. It is possible to insert the information of multiple users in one coinbase transaction created in step 7. In this case, the public parameters in step 7.a would need to be inserted only once at the beginning, followed by each user's IBE public key and validity check transaction identifiers (steps 7.b and 7.c). The same public parameters are used for each user. The number of public keys that can be added to one coinbase transaction will only be limited by the size of the transaction or any other size limits imposed by the blockchain protocol.

It is possible to use the transaction sequence field of a transaction to have a set of IBE keys activated at a later date. This can be particularly useful when having a separate server that is responsible for generating keys and then goes offline to reduce its exposure time. In this case, the server generates sets of keys and inserts them in time-locked transactions to be activated automatically later by a mining node. The same technique can also be used to provide automatic key updates, by creating a time-locked transaction that spends a validity check output with a spending transaction comprising an updated IBE key.

The identifier of Alice can be in the form of $$ID_A=identifier\_string\_type\|identifier\_value\|functional\_string\_type\|value$$

The identifier_string can be an email, a mobile number, a passport number, or a social platform account, etc. The functional_string can be one of or a combination of any of the following Expiry date: after which this $ID_A$ should not be used, and a new $ID_A$ with a new expiry date should be used. The key generator service provider will have to generate and send the private keys for the new $ID_A$. This would ensure updating of the IBE keys. The period of update can be set every month, or every day, etc depending on the use case requirements.

Valid from date: this can be used to ensure that the private key generator does not release the private keys before that date. In this instance the key generator service provider is used to enforce time-locks. Dates can be optionally be in blockchain height.

Attribute: The service provider would send the private keys only if this attribute or a set of them is satisfied. This can be used to enforce attribute-based access control, location encryption. For example, Bob 103b can send a message that can be decrypted if Alice 103a has a security clearance. The key generator service provider would only release the decryption key to Alice 103a if she can satisfy this requirement.

Use Cases

Figure 7:
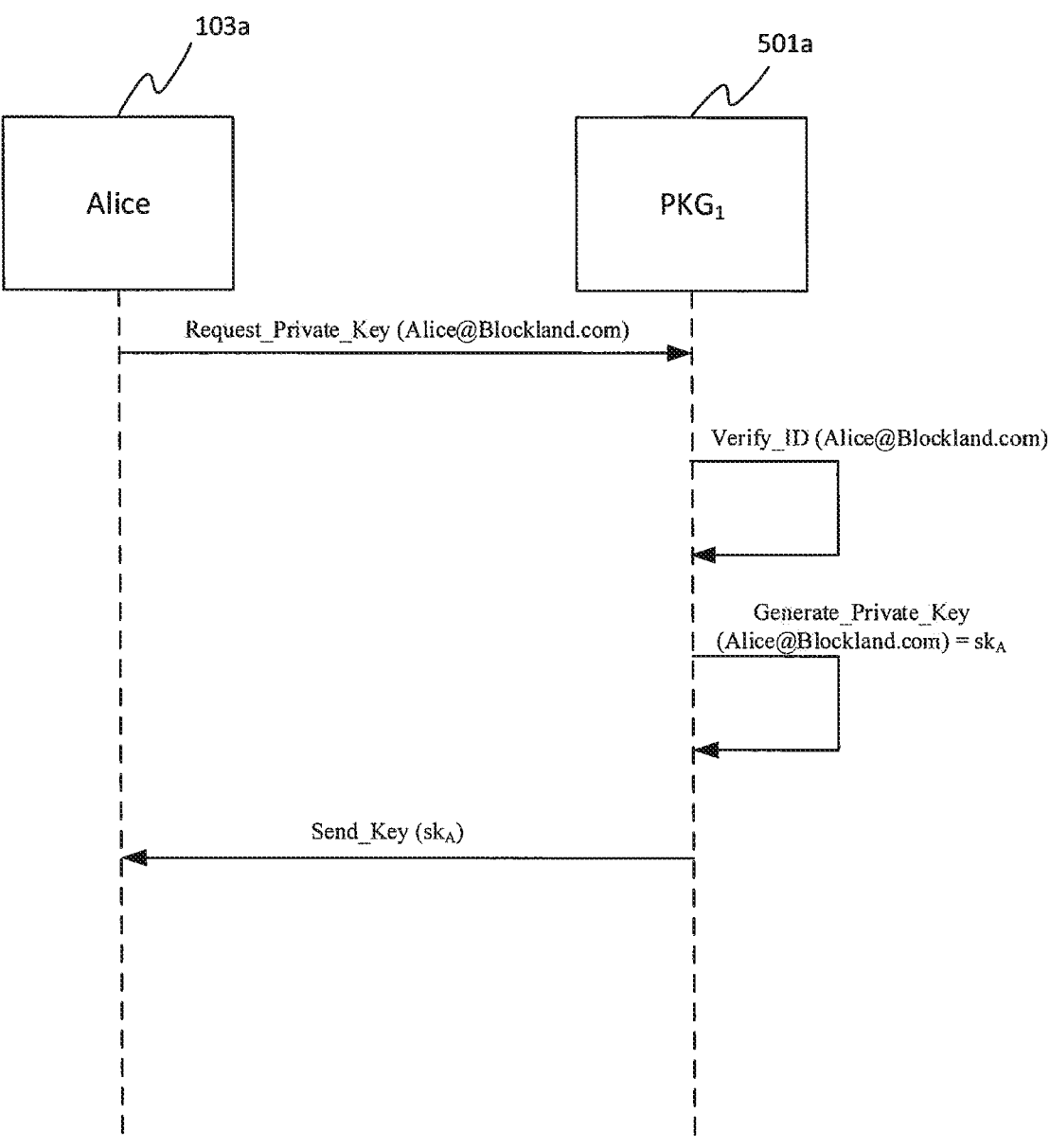
FIG. 7 is a sequence diagram for an example method of requesting an identity-based public key from a key generating party.

FIG. 7 illustrates a first use case (UC1). Alice 103a contacts private key generator PKG1 501a to generate a private key that corresponds to her email address. PKG1 501a verifies that the email address belongs to Alice 103a and sends her a private key $sk_{Alice}$ using a secure channel. This use case can be carried out on the blockchain by having Alice's request and PKG1's response inserted after OP_RETURN in two blockchain transactions. Alice 103a may insert a public encryption key ($PK_{Alice}$) in her request to PKG1 501a to secure a channel, yet it can be skipped if such a channel already exists. PKG1 501a carries out verification and key generation steps and sends Alice's private key, encrypted using $PK_{Alice}$, in the response transaction. The two example transactions are illustrated below.

| TxID₁ | | | |
|---|---|---|---|
| Inputs | | Outputs | |
| Unlocking script | | Locking script | |
| Any of Alice's UTXO | $<Sig(P_{Alice},$ $Tx_1) >< P_{Alice}>$ | Service fee | A locking script P2PKH: <PKG1 address> |
| | | 0 | OP_RETURN Action: Request Private Key Id_value: Alice@Blockland.com Verification required: true Public key parameters : $<pk_{Alice}>$ //Alice's key to send her back her private key |

| TxID₂ | | | |
|---|---|---|---|
| Inputs | | Outputs | |
| Unlocking script | | Locking script | |
| TxID₁ vout = 0 | $<Sig(P_{PKG1},$ $Tx_2) >< P_{PKG1}>$ | Minimum charge | A locking script P2PKH: <Alice's address> |
| | | 0 | OP_RETURN Action: Send key Id_value: Alice@Blockland.com Id verified: true Public key parameters : $<pk\_PKG1>$ Encrypted private key: $<encrypted\ sk_{Alice}>$ //Encrypted using $pk_{Alice}$ |

Note that the above transactions are simplified to convey the concept. A more detailed transaction might potentially include an ephemeral encryption key and initialization vector, and an extra output for any change.

A second use case (UC2) is illustrated by the below transactions. Alice 103a adds her own private key such that her keys are secure even if the partial private key generated by PKG1 is leaked. There are at least two possible ways for Alice to announce $(X_A, Y_A)$ on the blockchain. The first way is a single transaction where Alice 103a pays herself.

| TxID₃ | | | |
|---|---|---|---|
| Inputs | | Outputs | |
| Unlocking script | | Locking script | |
| TxID₂ vout = 0 | $<Sig(P_{Alice},$ $Tx_3) >< P_{Alice}>$ | Minimum charge | A locking script P2PKH: <Alice's BSV address> |
| | | 0 | OP_RETURN Action: Publish key parameters Id_value: Alice@Blockland.com Id verified: true |

-continued

| TxID₃ | | | |
|---|---|---|---|
| Inputs | | Outputs | |
| Unlocking script | | Locking script | |
| | | | Public key parameters : <pk_PKG1> Key Parameters: $<X_A, Y_A>$ |

The second way is in the form of two transactions (request and response) between Alice 103a and PKG1 501a.

| TxID₄ | | | |
|---|---|---|---|
| Inputs | | Outputs | |
| Unlocking script | | Locking script | |
| TxID₂ vout = 0 | $<Sig(P_{Alice},$ $Tx_4) >< P_{Alice}>$ | Service fee | A locking script P2PKH: <PKG1 address> |
| | | 0 | OP_RETURN Action: Request confirmation Id_value: Alice@Blockland.com Public key parameters : <pk_PKG1> Key Parameters: $<X_A, Y_A>$ |

| TxID₅ | | | |
|---|---|---|---|
| Inputs | | Outputs | |
| Unlocking script | | Locking script | |
| TxID₄ vout = 0 | $<Sig(P_{PKG1},$ $Tx_5) >< P_{PKG1}>$ | Minimum charge | A locking script P2PKH: <Alice's address> |
| | | 0 | OP_RETURN Action: Confirmation response Id_value: Alice@Blockland.com Public key parameters : <pk_PKG1> Key Parameters: $<X_A, Y_A>$ |

Figure 8A:
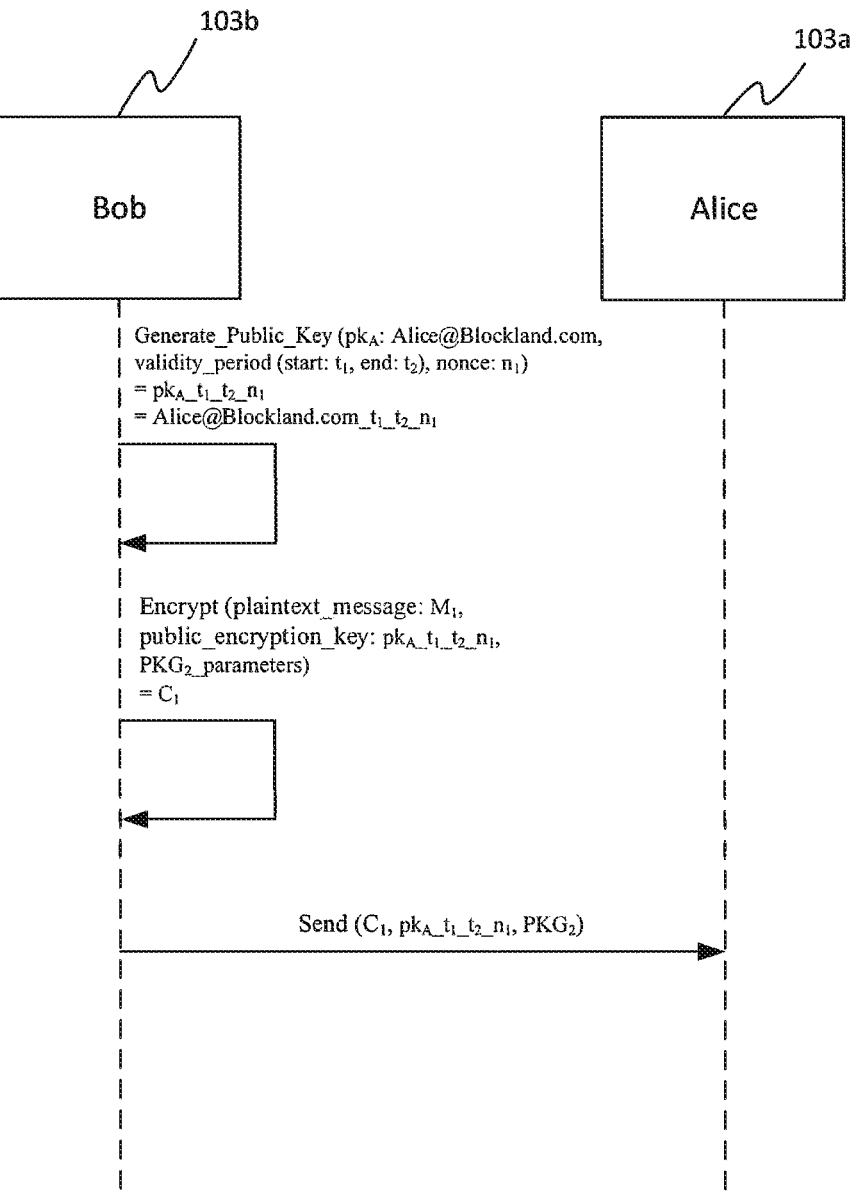
FIG. 8a is a sequence diagram for an example method of sending a message encrypted using an identity-based public key.
Figure 8B:
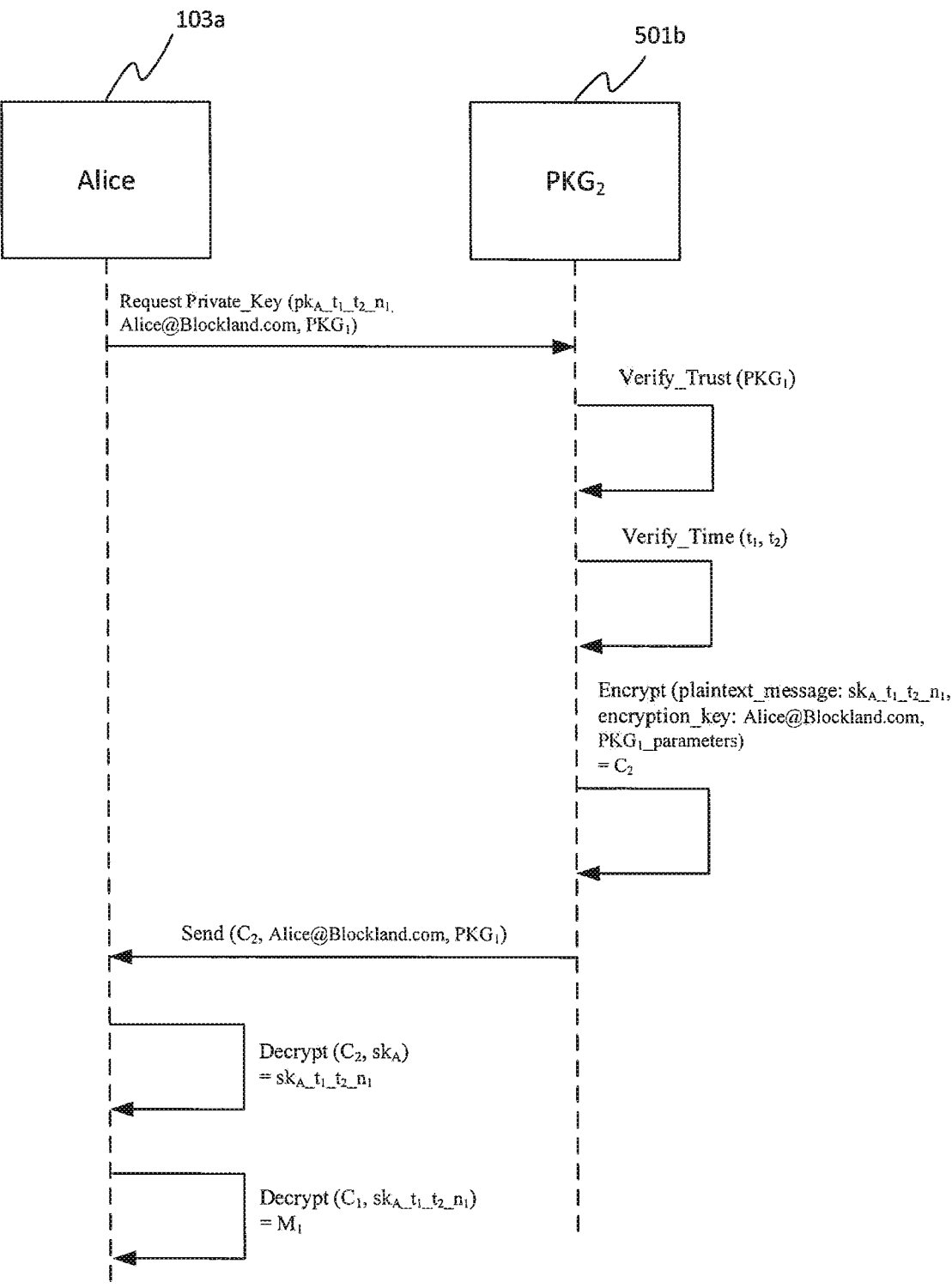
FIG. 8b is a sequence diagram for an example method of decrypting a message that has been encrypted using the identity-based public key.

FIGS. 8a and 8b illustrate a third example use case (UC3). Bob 103b wants to send Alice 103a a message that she can only read within a time frame (not before t1 and not after t2). Such a service may be provided by another key generator PKG2 501b other than PKG1 501a. Bob 103b generates a new IBE public key for Alice 103a that uses Alice's IBE public key generated based on Alice@Blockland.com (which was verified and generated by PKG1 in UC1), and inserts the validity period and a random nonce. He uses the newly generated IBE public key Alice@Blockland.com_PKG1_t1_t2_nonce along with PKG2's public key parameters to encrypt a message M1 to output C1. He sends Alice 103a the ciphertext and the IBE public key he used in encryption. PKG2 501b may be a service provider on the blockchain, e.g. a mining node 104M or a non-mining node. Bob 103b can retrieve the public key parameters from PKG2 501b. When Bob 103b generates the new IBE public key, he retrieves $PK_{Alice}$ and PKG1's public parameters from the blockchain 150. He should make sure that PKG1 is a private key generator and trustable identity verifier service provider.

Alice 103a contacts PKG2 501b to obtain a private key to unlock Bob's encrypted message C1. PKG2 501b would check that PKG1 501a is a trusted service provider, and check that the time of request is between t1 and t2. If all checks are passed, PKG2 501*b* will generate a private key for Alice 103*a* that corresponds to the encryption key generated and used by Bob 103*b*. The new private key can be encrypted into C2 using Alice's existing IBE key (i.e. generated based on Alice@Blockland.com). Note that in this use case, PKG2 103*b* provided the time check service and depended on PKG1 501*a* to run the email verification service, which was already done in UC1. Similarly to UC1, the communication between Alice 103*a* and PKG2 501*b* happens on the blockchain 150.

These use cases show how the IBE protocol can be used to allow Bob (encrypting party) to set his conditions for Alice (decrypting party) to be able to decrypt the message. In UC1 Alice obtains an IBE key from PKG1. Bob uses a different PKG, PKG2, to check that Alice fulfils Bob's conditions.

CONCLUSION

It will be appreciated that the above embodiments have been described by way of example only. More generally there may be provided a method, apparatus or program in accordance with any one or more of the following Statements.

Statement 1. A computer-implemented method for generating an identity-based cryptographic key, the method being performed by a first party having a personal identifier, and comprising:

obtaining a set of private key shares and a set of corresponding public key shares, wherein each private key share is generated based on the personal identifier, and wherein at least one of the set of private key shares is generated by a respective one of a set of key-generating parties;

generating an identity-based private key based on each of the one or more private key shares; and generating a partial identity-based public key, wherein the partial identity-based public key is generated based on each of the set of corresponding public key shares;

transmitting the partial identity-based public key to at least one of the set of key-generating parties for generating the identity-based public key, wherein the identity-based public key comprises the personal identifier and the partial identity-based public key; and/or generating the identity-based public key, wherein the identity-based public key comprises the personal identifier and the partial identity-based public key.

A key share is a component of a private key which, along with or more other key shares, can be used to generate the private key.

Statement 2. The method of statement 1, wherein a first output of a first blockchain transaction comprises the identity-based public key, the identity-based public key comprising the personal identifier and the partial identity-based public key, and wherein the method comprises obtaining the identity-based public key from the first blockchain transaction.

Statement 3. The method of statement 2, wherein said obtaining of the identity-based public key from the first blockchain transaction comprises:

obtaining a transaction identifier of the first blockchain transaction from at least one of the one or more key-generating parties; and using the transaction identifier to obtain the first blockchain transaction from a blockchain in which the first blockchain transaction is recorded.

Statement 4. The method of any of statement 1 to 3, comprising:

obtaining the identity-based public key from at least one of the set of key-generating parties.

Statement 5. The method of any of statements 1 to 4, comprising:

encrypting a first message using the identity-based public key to generate a first encrypted message; and transmitting the first encrypted message to a second party, and/or generating a second blockchain transaction comprising an output that comprises the encrypted message.

Statement 6. The method of any of statements 1 to 5, comprising:

obtaining a second encrypted message encrypted using the identity-based public key; and decrypting the second encrypted message using the private key to reveal a second message.

Statement 7. The method of any of statements 1 to 6, comprising, transmitting the personal identifier to at least one of the one or more key-generating parties.

Statement 8. The method of statement 7, wherein said transmitting of the personal identifier comprises:

generating a third blockchain transaction comprising an output that comprises the personal identifier; and transmitting the third blockchain transaction to one or more nodes of the blockchain network for inclusion in the blockchain.

Statement 9. The method of statement 2 or any statement dependent thereon, wherein the first party has a first public key, wherein the first blockchain transaction comprises a second output locked to the first public key of the first party, and wherein the method comprises:

generating a fourth blockchain transaction comprising an input that a) references the second output of the first blockchain transaction, and b) comprises a signature generated based on a private key corresponding to the first public key of the first party; and transmitting the fourth blockchain transaction to one or more nodes of the blockchain network for inclusion in the blockchain.

The first and second outputs of the first blockchain transaction may be the same output. That is, the identity-based public key may be included in a spendable (e.g. P2PKH) output. For instance, the output may include the public key using OP_PUSHDATA and OP_DROP.

Statement 10. The method of any of statements 1 to 9, wherein said transmitting of the partial identity-based public key to the at least one of the set of key-generating parties comprises:

generating a fifth blockchain transaction comprising an output that comprises the partial identity-based public key; and transmitting the fifth blockchain transaction to one or more nodes of the blockchain network for inclusion in the blockchain.

Statement 11. The method of any of statements 1 to 10, wherein the identifier of the first party comprises one or more of: a name and/or address of the first party, an email address of the first party, a phone number, a passport number, a driving license number, a social media profile, a birth date, and a group member identifier.

Statement 12. A computer-implemented method for generating an identity-based cryptographic key, wherein a first party has a personal identifier, and wherein the method is performed by a first key-generating party and comprises: transmitting a private key share to the first party, wherein the private key share is generated based on the personal identifier and has a corresponding public key share;

obtaining a partial identity-based public key, wherein the partial identity-based public key is generated based on the corresponding public key share;

generating and/or obtaining the identity-based public key, wherein the identity-based public key is generated based on the partial identity-based public key and the personal identifier; and generating a first blockchain transaction comprising a first output that comprises the identity-based public key.

In examples, the method comprises generating the private key share and the corresponding public key share.

Statement 13. The method of statement 12, comprising, transmitting the first blockchain transaction to one or more nodes of a blockchain network for inclusion in a blockchain.

Statement 14. The method of statement 12, comprising, transmitting the first blockchain transaction to the first party.

Statement 15. The method of any of statements 12 to 14, wherein the first output of the first blockchain transaction is an unspendable output.

Statement 16. The method of any of statements 13 to 15, comprising, obtaining the personal identifier from the first party.

Statement 17. The method of statement 16, wherein the blockchain comprises a third blockchain transaction generated by the first party and comprising the personal identifier, and wherein said obtaining of the personal identifier from the first party comprises obtaining the personal identifier from the third blockchain transaction.

Statement 18. The method of any of statements 12 to 17, wherein the first key-generating party has a first public key, and wherein the first blockchain transaction comprises a second output locked to the first public key of the first key-generating party.

The first and second outputs may be the same output. Alternatively, the first and second outputs may be different outputs.

Statement 19. The method of statement 18, comprising:

generating a fourth blockchain transaction comprising an input that a) references the second output of the first blockchain transaction, and b) comprises a signature generated based on a private key corresponding to the public key of the first key-generating party; and transmitting the fourth blockchain transaction to one or more nodes of the blockchain network for inclusion in the blockchain.

Statement 20. The method of any of statements 12 to 19, wherein the first party has a first public key, and wherein the first blockchain transaction comprises a second output locked to the first public key of the first party.

Statement 21. The method of any of statements 12 to 20, wherein the blockchain comprises a fifth blockchain transaction comprising the partial identity-based public key, wherein said obtaining of the partial identity-based public key comprises obtaining the partial identity-based public key from the fifth blockchain transaction.

Statement 22. The method of any of statements 12 to 21, comprising:

generating a sixth blockchain transaction comprising an output that comprises the private key share, and wherein said transmitting of the private key share to the first party comprises transmitting the sixth blockchain transaction to one or more nodes of the blockchain network for inclusion in the blockchain.

Statement 23. The method of statement 22, wherein the private key share is transmitted in an encrypted form.

Statement 24. The method of any of statements 12 to 23, comprising:

generating a seventh blockchain transaction comprising an output that comprises a set of parameters used to generate the identity-based public key; and transmitting the seventh blockchain transaction to one or more nodes of the blockchain network for inclusion in the blockchain.

The seventh blockchain transaction may comprise an identifier of the first blockchain transaction.

Statement 25. The method of any of statements 24, wherein the partial identity-based public key is generated based on a plurality of public key shares, each public key share being generated by a respective one of a set of key-generating parties, and wherein the seventh blockchain transaction comprises the set of parameters used by each respective key-generating party to generate the identity-based public key.

Statement 26. The method of statement 24 or statement 25, wherein the first key-generating party is a mining node of the blockchain network, and wherein the seventh blockchain transaction is a generation transaction.

By using a generation (i.e. coinbase) transaction to record the identifier of the first blockchain transaction and the parameters used to generate the identity-based key, trust in the PoW shown by the mining node can be delegated to the trust on the generated cryptographic keys, and therefore, the mining nodes can be regarded as trusted certificate authorities.

Statement 27. Computer equipment comprising:

memory comprising one or more memory units; and processing apparatus comprising one or more processing units, wherein the memory stores code arranged to run on the processing apparatus, the code being configured so as when on the processing apparatus to perform the method of any of statements 1 to 26.

Statement 28. A computer program embodied on computer-readable storage and configured so as, when run on computer equipment of statement 27, to perform the method of any of statements 1 to 26.

According to another aspect of the teachings disclosed herein, there may be provided a method comprising the actions of the first party and the key-generating party.

According to another aspect of the teachings disclosed herein, there may be provided a system comprising the computer equipment of the first party and the key-generating party.

Other variants may become apparent to a person skilled in the art once given the disclosure herein. The scope of the present disclosure is not limited by the disclosed embodiments but only by the accompanying claims.

The invention claimed is:

1. A computer-implemented method for generating an identity-based cryptographic key, the method being performed by a first party having a personal identifier, and comprising:

obtaining a set of private key shares and a set of corresponding public key shares, wherein each private key share is generated based on the personal identifier of the first party, and wherein at least one of the set of private key shares is generated by a respective one of a set of key-generating parties;

generating an identity-based private key based on each of the set of each of the one or more private key shares; and generating a partial identity-based public key based on each of the set of corresponding public key shares, wherein the partial identity-based public key does not correspond to the identity-based private key; and wherein the method also comprises;

transmitting the partial identity-based public key to at least one of the set of key-generating parties for generating the a complete identity-based public key, wherein the complete identity-based public key comprises the personal identifier and the partial identity-based public key; and/or generating the complete identity-based public key based on the personal identifier and the partial identity-based public key, wherein the complete identity-based public key corresponds to the identity-based private key; and wherein the method further comprises:

i) encrypting a first message using the complete identity-based public key to generate a first encrypted message; and transmitting the first encrypted message to a second party, and/or generating a second blockchain transaction comprising an output that comprises the encrypted message; or ii) obtaining a second encrypted message encrypted using the complete identity-based public key; and decrypting the second encrypted message using the private key to reveal a second message.

2. The method of claim 1, wherein a first output of a first blockchain transaction comprises the complete identity-based public key, the complete identity-based public key comprising the personal identifier and the partial identity-based public key, and wherein the method comprises obtaining the complete identity-based public key from the first blockchain transaction.

3. The method of claim 2, wherein said obtaining of the complete identity-based public key from the first blockchain transaction comprises:

obtaining a transaction identifier of the first blockchain transaction from at least one of the one or more key-generating parties; and using the transaction identifier to obtain the first blockchain transaction from a blockchain in which the first blockchain transaction is recorded.

4. The method of claim 1, comprising:

obtaining the complete identity-based public key from at least one of the set of key-generating parties.

5. The method of claim 1, comprising, transmitting the personal identifier to at least one of the one or more key-generating parties.

6. The method of claim 5, wherein said transmitting of the personal identifier comprises:

generating a third blockchain transaction comprising an output that comprises the personal identifier; and transmitting the third blockchain transaction to one or more nodes of the blockchain network for inclusion in the blockchain.

7. The method of claim 2, wherein the first party has a first public key, wherein the first blockchain transaction comprises a second output locked to the first public key of the first party, and wherein the method comprises:

generating a fourth blockchain transaction comprising an input that a) references the second output of the first blockchain transaction, and b) comprises a signature generated based on a private key corresponding to the first public key of the first party; and transmitting the fourth blockchain transaction to one or more nodes of the blockchain network for inclusion in the blockchain.

8. The method of claim 1, wherein said transmitting of the partial identity-based public key to the at least one of the set of key-generating parties comprises:

generating a fifth blockchain transaction comprising an output that comprises the partial identity-based public key; and transmitting the fifth blockchain transaction to one or more nodes of the blockchain network for inclusion in the blockchain.

9. The method of claim 1, wherein the identifier of the first party comprises one or more of: a name and/or address of the first party, an email address of the first party, a phone number, a passport number, a driving license number, a social media profile, a birth date, and a group member identifier.

10. A computer-implemented method for generating an identity-based cryptographic key, wherein a first party has a personal identifier, and wherein the method is performed by a first key-generating party and comprises:

transmitting a private key share to the first party, wherein the private key share is generated based on the personal identifier of the first party and has a corresponding public key share;

obtaining a partial identity-based public key, based on the corresponding public key share, wherein the partial identity-based public key does not correspond to the identity-based private key;

generating and/or obtaining the complete identity-based public key, wherein the complete identity-based public key is generated based on the partial identity-based public key and the personal identifier, and wherein the complete identity-based public key corresponds to the identity-based private key; and generating a first blockchain transaction comprising a first output that comprises the complete identity-based public key.

11. The method of claim 10, comprising, transmitting the first blockchain transaction to one or more nodes of a blockchain network for inclusion in a blockchain.

12. The method of claim 10, comprising, transmitting the first blockchain transaction to the first party.

13. The method of claim 11, comprising, obtaining the personal identifier from the first party.

14. The method of claim 10, wherein the first key-generating party has a first public key, and wherein the first blockchain transaction comprises a second output locked to the first public key of the first key-generating party.

15. The method of claim 14, comprising:

generating a fourth blockchain transaction comprising an input that a) references the second output of the first blockchain transaction, and b) comprises a signature generated based on a private key corresponding to the public key of the first key-generating party; and transmitting the fourth blockchain transaction to one or more nodes of the blockchain network for inclusion in the blockchain.

16. The method of claim 10, wherein the first party has a first public key, and wherein the first blockchain transaction comprises a second output locked to the first public key of the first party.

17. Computer equipment comprising:

memory comprising one or more memory units; and processing apparatus comprising one or more processing units, wherein the memory stores code arranged to run on the processing apparatus, the code being configured so as when on the processing apparatus to perform a method of generating an identity-based cryptographic key, the method being performed by a first party having a personal identifier, and comprising:

obtaining a set of private key shares and a set of corresponding public key shares, wherein each private key share is generated based on the personal identifier of the first party, and wherein at least one of the set of private key shares is generated by a respective one of a set of key-generating parties;

generating an identity-based private key based on each of the one or more private key shares; and generating a partial identity-based public key based on each of the set of corresponding public key shares, wherein the partial identity-based public key does not correspond to the identity-based private key; and wherein the method also comprises;

transmitting the partial identity-based public key to at least one of the set of key-generating parties for generating the a complete identity-based public key, wherein the complete identity-based public key comprises the personal identifier and the partial identity-based public key; and/or generating the complete identity-based public key based on the personal identifier and the partial identity-based public key, wherein the complete identity-based public key corresponds to the identity-based private key; and wherein the method further comprises:

i) encrypting a first message using the complete identity-based public key to generate a first encrypted message; and transmitting the first encrypted message to a second party, and/or generating a second blockchain transaction comprising an output that comprises the encrypted message; or ii) obtaining a second encrypted message encrypted using the complete identity-based public key; and decrypting the second encrypted message using the private key to reveal a second message.

18. A computer program embodied on computer-readable storage and configured so as, when run on computer equipment, to perform a method of generating an identity-based cryptographic key, the method being performed by a first party having a personal identifier, and comprising:

obtaining a set of private key shares and a set of corresponding public key shares, wherein each private key share is generated based on the personal identifier of the first party, and wherein at least one of the set of private key shares is generated by a respective one of a set of key-generating parties;

generating an identity-based private key based on each of the one or more private key shares; and generating a partial identity-based public key based on each of the set of corresponding public key shares, wherein the partial identity-based public key does not correspond to the identity-based private key; and wherein the method also comprises;

transmitting the partial identity-based public key to at least one of the set of key-generating parties for generating the a complete identity-based public key, wherein the complete identity-based public key comprises the personal identifier and the partial identity-based public key; and/or generating the complete identity-based public key based on the personal identifier and the partial identity-based public key, wherein the complete identity-based public key corresponds to the identity-based private key; and wherein the method further comprises:

i) encrypting a first message using the complete identity-based public key to generate a first encrypted message; and transmitting the first encrypted message to a second party, and/or generating a second blockchain transaction comprising an output that comprises the encrypted message; or ii) obtaining a second encrypted message encrypted using the complete identity-based public key; and decrypting the second encrypted message using the private key to reveal a second message.

* * * * *